United States Patent
Fujimoto et al.

(10) Patent No.: US 10,591,280 B2
(45) Date of Patent: Mar. 17, 2020

(54) CONFOCAL DISPLACEMENT SENSOR

(71) Applicant: Keyence Corporation, Osaka (JP)

(72) Inventors: Suketaka Fujimoto, Osaka (JP); Hideto Takei, Osaka (JP); Yohei Masuguchi, Osaka (JP); Shoma Kuga, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 16/364,209

(22) Filed: Mar. 26, 2019

(65) Prior Publication Data
US 2019/0360796 A1 Nov. 28, 2019

(30) Foreign Application Priority Data

May 25, 2018 (JP) .................. 2018-101072

(51) Int. Cl.
*G01B 11/06* (2006.01)
(52) U.S. Cl.
CPC ................ *G01B 11/0633* (2013.01)
(58) Field of Classification Search
CPC .............. G01B 11/026; G01B 2210/50; G01B 11/0608; G01B 11/14; G01B 9/02044; G01B 11/24; G01B 21/045; G01B 9/02007; G01B 11/06; G01B 11/18; G01B 21/042; G01B 2290/70; G01B 9/02003; G01B 9/02021; G01B 9/02022; G01B 9/02027; G01B 11/285; G01B 11/30; G01B 9/02049; G01J 3/0208; G01J 3/0291; G01J 3/10; G01J 3/021; G01J 3/0205; G01J 3/0216; G01J 3/027; G01J 3/18; G01J 3/2803;
(Continued)

(56) References Cited

U.S. PATENT DOCUMENTS 10,180,355 B2   1/2019 Kuga
10,260,859 B2   4/2019 Kuga
(Continued)

FOREIGN PATENT DOCUMENTS

JP       2015169546 A     9/2015

OTHER PUBLICATIONS

U.S. Appl. No. 16/282,333, filed Feb. 22, 2019 (163 pages).
U.S. Appl. No. 16/296,264, filed Mar. 8, 2019 (148 pages).

*Primary Examiner* — Michael P Stafira
(74) *Attorney, Agent, or Firm* — Kilyk & Bowersox, P.L.L.C.

(57) ABSTRACT

Optical axes of lens units of measurement heads are adjusted so as to be parallel to each other. The lens unit includes a diffraction lens. When adjusting the optical axis, in a state where the measurement heads face each other with a reference member interposed therebetween, light having a plurality of wavelengths are emitted from the measurement heads to one surface and the other surface of the reference member, respectively. Intensities of primary light having one wavelength, which are reflected by one surface and the other surface of the reference member respectively, and incident on the measurement heads through each of a path of a multi-order light having other wavelengths are displayed on a main display unit as information indicating a degree of orthogonality of the optical axes of the measurement heads with respect to the one surface and the other surface of the reference member.

20 Claims, 20 Drawing Sheets

(58) Field of Classification Search
CPC .... G01J 3/42; G01J 3/50; G01J 3/0218; G01J 3/14; G01J 3/024; G01J 3/0243; G01J 3/2823; G01J 3/00; G01J 3/02; G01J 3/0229; G01J 3/0248; G01J 3/36; G01J 3/4406; G02B 21/0076; G02B 21/0064; G02B 13/0075; G02B 21/16; G02B 23/2469; G02B 27/283; G02B 3/00; G02B 3/14; G02B 6/02052; G02B 13/22; G02B 21/0004; G02B 21/008; G02B 21/08; G02B 21/082; G02B 23/2476; G02B 27/30; G02B 27/48; G01N 21/21; G01N 21/8806; G01N 27/72; G01N 27/82; G01N 2021/6441; G01N 21/6456

See application file for complete search history.

(56) References Cited

U.S. PATENT DOCUMENTS

| | | | |
|---|---|---|---|
| 10,267,622 B2 | 4/2019 | Kuga | |
| 2018/0216933 A1* | 8/2018 | Sugiyama | G05B 19/402 |
| 2018/0356207 A1* | 12/2018 | Takei | G01B 11/026 |
| 2018/0356208 A1* | 12/2018 | Kuga | G01B 9/02044 |
| 2018/0356284 A1* | 12/2018 | Takei | G01B 11/026 |
| 2019/0094074 A1 | 3/2019 | Kuga | |

* cited by examiner

CONFOCAL DISPLACEMENT SENSOR

CROSS-REFERENCE TO RELATED APPLICATIONS

The present application claims foreign priority based on Japanese Patent Application No. 2018-101072, filed May 25, 2018, the contents of which is incorporated herein by reference.

BACKGROUND OF THE INVENTION

1. Field of the Invention

The present invention relates to a confocal displacement sensor capable of measuring a thickness of a measurement object.

2. Description of Related Art

As an apparatus for measuring a displacement of a surface of a measurement object by a non-contact method, there is a confocal displacement sensor. In the confocal displacement sensor, a light with a wide wavelength band is emitted to the measurement object through an optical member, and displacement of the surface of the measurement object is measured based on a light receiving signal of a light have been focused and reflected by the surface of the measurement object.

A method is known in which two optical members of confocal displacement sensor are disposed to face each other and the thickness of a measurement object disposed between the two optical members is measured. In this method, in order to measure the thickness of the measurement object with high accuracy, it is required to precisely align an optical axis of one optical member of confocal displacement sensor and the other optical axis of the optical member of the confocal displacement sensor.

JP-A-2015-169546 (Patent Literature 1) describes an optical axis adjustment method in which optical axes of two sensor heads of two confocal measurement apparatuses are made to align with each other in order to measure a thickness of a measurement object as described above. In the optical axis adjustment method, an operator arranges two sensor heads to face each other, and coarsely adjusts postures (orientation) and positions of the sensor heads.

Thereafter, a detection light is generated from one sensor head, an intensity of the detection light incident on the other sensor head is measured, and the position of at least one of the two sensor heads is adjusted in three directions orthogonal to each other so that a waveform of the detection light acquired by the measurement has one peak value.

SUMMARY OF THE INVENTION

In the method described in Patent Literature 1, the operator adjusts the postures of the two sensor heads so that the optical axes of the two sensor heads are parallel to each other. However, in practice, it is not easy to accurately adjust the postures of the two sensor heads so that the optical axes of the two sensor heads are parallel to each other. If the optical axis of one sensor head is inclined with respect to the optical axis of the other sensor head, the optical axes of the two sensor heads cannot align each other even if the positional relationship between the two sensor heads is adjusted. Therefore, measurement accuracy of the thickness of the measurement object is lowered.

Not limited to the above example, even when a measurement of a measurement object is performed using one sensor head, it is desired that the posture of the sensor head be easily and accurately adjusted in order to perform the measurement more accurately.

An object of the present invention is to provide a confocal displacement sensor capable of easily and accurately adjusting a posture of a measurement head unit so that a measurement of a measurement object can be performed with high accuracy.

(1) According to a first aspect of the invention, there is provided a confocal displacement sensor including: a light projecting unit which emits light having a plurality of wavelengths; a first head unit which includes a first confocal optical system having a first diffraction lens, generating chromatic aberration along an optical axis direction in the light emitted by the light projecting unit, and converging the light on a first surface of a measurement object; a first spectroscope which divides a first light by each wavelength, the first light having been reflected by the first surface and having passed through the first confocal optical system; a first light receiving unit which receives the divided first light for each wavelength and acquires an intensity of the light for each wavelength; and a control device which is configured to be able to adjust an optical axis of the first head unit using a reference member having the first surface, in which the first head unit is configured such that a first primary light having one wavelength, which is emitted to the first surface through the first head unit, is reflected by the first surface and passes the first confocal optical system through a path of a first multi-order light having the one wavelength when the optical axis of the first head unit is orthogonal to the first surface, and the control device includes an intensity information display control unit causing a display unit to display, when adjusting the optical axis, as first intensity information, information on an intensity of a first determination light acquired from the first primary light having been reflected by the first surface and having passed the first confocal optical system through the path of the first multi-order light from among the intensities of the light that the first light receiving unit receives, in a state where the reference member is disposed on a light emitting side of the first head unit.

In the confocal displacement sensor, when adjusting the optical axis of the first head unit, information on the intensity of the first determination light is displayed on the display unit as first intensity information in a state where the reference member is disposed on the light emitting side of the first head unit. The intensity of the first determination light is higher as the degree of orthogonality of the optical axis of the first head unit with respect to the first surface is higher, and is lower as the degree of orthogonality of the optical axis of the first head unit with respect to the first surface is lower. Therefore, a user can easily and accurately adjust the posture of the first head unit so that the optical axis of the first head unit is orthogonal to the first surface of the reference member while visually recognizing the first intensity information.

As a result, the user can easily and accurately adjust the posture of the first head unit with respect to the measurement surface of the measurement object so as to perform measurement with high accuracy.

(2) According to a second aspect of the invention, there is provided a confocal displacement sensor capable of measuring a thickness of a measurement object having first and second surfaces on opposite sides, the confocal displacement sensor including: a light projecting unit which emits light having a plurality of wavelengths; a first head unit which includes a first confocal optical system having a first diffraction lens, generating chromatic aberration along an optical axis direction in the light emitted by the light projecting unit, and converging the light on the first surface of the measurement object; a second head unit which includes a second confocal optical system having a second diffraction lens, generating chromatic aberration along an optical axis direction in the light emitted by the light projecting unit, and converging the light on the second surface of the measurement object; a first spectroscope which divides a first light by each wavelength, the first light having been reflected by the first surface and having passed through the first confocal optical system; a first light receiving unit which receives the divided first light for each wavelength and acquires an intensity of the light for each wavelength; and a control device which is configured to be able to adjust an optical axis of the first head unit using a reference member having the first and second surfaces parallel to each other instead of the measurement object, in which the first head unit is configured such that a first primary light having one wavelength, which is emitted to the first surface through the first head unit, is reflected by the first surface and passes the first confocal optical system through a path of a first multi-order light having the one wavelength when the optical axis of the first head unit is orthogonal to the first surface, the second head unit is configured such that a second primary light having one wavelength, which is emitted to the second surface through the second head unit, is reflected by the second surface and passes the second confocal optical system through a path of a second multi-order light having the one wavelength when the optical axis of the second head unit is orthogonal to the second surface, and the control device includes an intensity information display control unit causing a display unit to display, when adjusting the optical axis, as first intensity information, information on an intensity of a first determination light acquired by the first primary light having been reflected by the first surface and having passed the first confocal optical system through the path of the first multi-order light from among intensities of the light that the first light receiving unit receives, in a state where the reference member is disposed between the first head unit and the second head unit.

In the confocal displacement sensor, when adjusting the optical axis of the first head unit, information on the intensity of the first determination light is displayed on the display unit as first intensity information in a state where the reference member is disposed between the first head unit and the second head unit. The intensity of the first determination light is higher as the degree of orthogonality of the optical axis of the first head unit with respect to the first surface is higher, and is lower as the degree of orthogonality of the optical axis of the first head unit with respect to the first surface is lower. Therefore, a user can easily and accurately adjust the posture of the first head unit so that the optical axis of the first head unit is orthogonal to the first surface of the reference member while visually recognizing the first intensity information.

As described above, the user can align the optical axes of the first and second head units by adjusting the posture of the first head unit and adjusting the relative positional relationship between the first and second head units.

As a result, the user can measure the thickness of the measurement object with high accuracy after adjusting the optical axes of the first and second head units.

(3) The confocal displacement sensor may further include a second spectroscope which divides the second light by each wavelength, the second light having been reflected by the second surface and having passed through the second confocal optical system; and a second light receiving unit which receives the divided second light for each wavelength and acquires an intensity of the light for each wavelength, in which the control device may be configured to be able to further adjust the optical axis of the second head unit using the reference member, and the intensity information display control unit may cause the display unit to further display, when adjusting the optical axis, as second intensity information, information on an intensity of a second determination light acquired from the second primary light having been reflected by the second surface and having passed the second confocal optical system through the path of the second multi-order light from among intensities of the light that the second light receiving unit receives, in a state where the reference member is disposed between the first head unit and the second head unit.

In this case, when adjusting the optical axis of the second head unit, information on the intensity of the second determination light is displayed on the display unit as the second intensity information in a state where the reference member is disposed between the first head unit and the second head unit. The intensity of the second determination light is higher as the degree of orthogonality of the optical axis of the second head unit with respect to the second surface is higher, and is lower as the degree of orthogonality of the optical axis of the second head unit with respect to the second surface is lower. Therefore, the user can easily and accurately adjust the posture of the second head unit so that the optical axis of the second head unit is orthogonal to the second surface of the reference member while visually recognizing the second intensity information.

As described above, the user can align the optical axes of the first and second head units by adjusting the posture of the second head unit and adjusting the relative positional relationship between the first and second head units.

As a result, the user can measure the thickness of the measurement object with high accuracy after adjusting the optical axes of the first and second head units.

(4) The first intensity information may indicate a temporal change in an intensity of the first determination light, and the second intensity information may indicate a temporal change in an intensity of the second determination light.

In this case, the user can more easily and accurately adjust the postures of the first and second head units by visually recognizing the first and second intensity information.

(5) The control device may further include a maximum intensity display control unit that causes the display unit to display first maximum intensity information indicating a maximum intensity by a present point in time in the temporal change of the intensity of the first determination light, and causes the display unit to display second maximum intensity information indicating a maximum intensity by the present point in time in the temporal change of the intensity of the second determination light.

In this case, the user can even more easily and accurately adjust the postures of the first and second head units by visually recognizing the first and second maximum intensity information.

(6) A peak wavelength of the first determination light may change according to a distance between the first surface and the first head unit, and a peak wavelength of the second determination light changes according to a distance between the second surface and the second head unit, and the control device may further include a range display control unit which controls the display unit to display a waveform of the first determination light on a wavelength axis, to change a position of the waveform of the first determination light on the wavelength axis according to a change in the distance between the first surface and the first head unit, and to display a range of the wavelength of the first determination light on the wavelength axis as a first wavelength range when the distance between the first surface and the first head unit is within a predetermined first distance range, and controls the display unit to display a waveform of the second determination light on the wavelength axis, to change a position of the waveform of the second determination light on the wavelength axis according to a change in the distance between the second surface and the second head unit, and to display a range of the wavelength of the second determination light on the wavelength axis as a second wavelength range when the distance between the second surface and the second head unit is within a predetermined second distance range.

In this case, the user adjusts the distance between the first surface and the first head unit so that the waveform of the first determination light displayed on the display unit is within the first wavelength range. Thereby, the distance between the first surface and the first head unit is within the first distance range. In addition, the user adjusts the distance between the second surface and the second head unit so that the waveform of the second determination light displayed on the display unit is within the second wavelength range. Thereby, the distance between the second surface and the second head unit is within the second distance range. As a result, the distance between the first head unit and the second head unit in the direction orthogonal to the first and second surfaces of the reference member can be easily and appropriately adjusted.

(7) The first and second light receiving units may acquire at least one of an intensity of the light emitted from the first confocal optical system of the first head unit and incident on the second confocal optical system of the second head unit and an intensity of the light emitted from the second confocal optical system of the second head unit and incident on the first confocal optical system of the first head unit in a state where the reference member does not exist between the first and second head units, and the control device may further include a aligning degree display control unit that causes the display unit to display aligning degree information indicating a aligning degree of optical axes of the first and second head units based on the at least one of the intensities acquired by the first and second light receiving units.

In this case, the user can easily align the optical axis of the first head unit and the optical axis of the second head unit by visually recognizing the aligning degree information.

(8) The control device may further include a distance adjustment image display control unit which causes the display unit to display, when adjusting the optical axis, a first distance adjustment image prompting an operation for adjusting a distance between the first head unit and the reference member, and a second distance adjustment image prompting an operation for adjusting a distance between the second head unit and the reference member, a posture adjustment image display control unit which causes the display unit to display, when adjusting the optical axis, a first posture adjustment image prompting an operation for adjusting a posture of the first head unit with respect to the reference member, and a second posture adjustment image prompting an operation for adjusting a posture of the second head unit with respect to the reference member, after the display unit displays the first and second distance adjustment images, and an axis adjustment image display control unit which causes the display unit to display, when adjusting the optical axis, an axis adjustment image prompting an operation for aligning the optical axes of the first and second head units by moving at least one of the first and second head units, after the display unit displays the first and second posture adjustment images.

In this case, after the first and second distance adjustment images are displayed on the display unit, the first and second posture adjustment images are displayed. After the first and second posture adjustment images are displayed on the display unit, an axis adjustment image is displayed. Thereby, the user can adjust the positions and postures of the first and second head units in an appropriate order according to the image displayed on the display unit. As a result, the user can efficiently adjust the optical axes of the first and second optical members.

(9) The confocal displacement sensor may further include a first operation unit operated by a user to instruct display of the first and second distance adjustment images; a second operation unit operated by the user to instruct display of the first and second posture adjustment images after displaying the first and second wavelength ranges by the range display control unit; and a third operation unit operated by the user to instruct display of the axis adjustment images after displaying the first and second intensity information by the intensity information display control unit.

In this case, the user can adjust the positions and postures of the first and second head units in an appropriate order by sequentially operating the first, second, and third operation units.

(10) The light projecting unit includes a first light projecting unit which emits a light to the first confocal optical system, and a second light projecting unit which emits a light to the second confocal optical system, and the control device may further include a light control unit which performs at least one of a first control for controlling emission of the light in the first light projecting unit based on a light receiving signal output from the second light receiving unit and a second control for controlling emission of the light in the second light projecting unit based on a light receiving signal output from the first light receiving unit when the aligning degree display control unit displays the aligning degree information.

In this case, according to the first control, the emission of the light in the first light projecting unit is controlled so that the light having an appropriate intensity is received in the second light receiving unit. According to the second control, the emission of the light in the second light projecting unit is controlled so that the light having an appropriate intensity is received in the first light receiving unit. As a result, the aligning degree information is appropriately displayed on the display unit.

(11) The intensity information display control unit may display the first and second intensity information simultaneously on a single screen of the display unit.

In this case, the first and second intensity information are simultaneously displayed on a single screen of the display unit. Therefore, the user can adjust the postures of the first and second head units while comparing the first and second intensity information.

(12) The confocal displacement sensor may use the light incident from one head unit of the first head unit and the second head unit to the other head unit to adjust the optical axis of the other head unit in a state where the first head unit and the second head unit are disposed to face each other.

In this case, the posture of one of the first and second head units can be accurately adjusted based on the light from the other head unit.

(13) According to a third aspect of the invention, there is provided a confocal displacement sensor capable of measuring a thickness of a measurement object having first and second surfaces on opposite sides, the confocal displacement sensor includes a light projecting unit which emits a plurality of light having a plurality of wavelengths; first and second head units; a first optical member provided in the first head unit, having a diffraction lens for generating chromatic aberration along an optical axis direction in the plurality of light emitted by the light projecting unit, and converging the plurality of light having chromatic aberration to emit each of the plurality of light to the first surface of a measurement object; a first pinhole member provided in the first head unit and having a plurality of first pinholes through which a plurality of light, which have been focused and reflected by the first surface, passes as a plurality of first light from among the plurality of light emitted to the first surface by the first optical member; a second optical member provided in the second head unit, having a diffraction lens for generating chromatic aberration along the optical axis direction in the plurality of light emitted by the light projecting unit, and converging the plurality of light having chromatic aberration to emit each of the plurality of light to the second surface of the measurement object; a second pinhole member provided in the second head unit and having a plurality of second pinholes through which a plurality of light, which have been focused and reflected by the second surface, passes as a plurality of second light from among the plurality of light emitted to the second surface by the second optical member; an acquisition unit which acquires intensities of the plurality of first light having passed through the plurality of first pinholes for each wavelength and acquires intensities of the plurality of second light having passed through the plurality of second pinholes for each wavelength; a thickness calculation unit which calculates a thickness between the first surface and the second surface of the measurement object based on the intensities of the plurality of first and second light for each wavelength acquired by the acquisition unit; and a control device which is configured to be able to adjust optical axes of the first and second optical members using a reference member having the first and second surfaces parallel to each other instead of the measurement object, in which the first head unit is configured such that a first primary light having one wavelength, which is emitted to the first surface through the first optical member, is reflected by the first surface and passes the first pinhole through a path of a first multi-order light having the one wavelength when an optical axis of the first optical member is orthogonal to the first surface, the second head unit is configured such that a second primary light having one wavelength, which is emitted to the second surface through the second optical member, is reflected by the second surface and passes the second pinhole through a path of a second multi-order light having the one wavelength when an optical axis of the second optical member is orthogonal to the second surface, and the control device includes an intensity information display control unit, when adjusting the optical axis, causing a display unit to display, as first intensity information, information on an intensity of a first determination light acquired from the first primary light having been reflected by the first surface and having passed the first pinhole through the path of the first multi-order light from among the intensities of the plurality of light that the acquisition unit acquires, and to display as second intensity information, information on an intensity of a second determination light acquired from the second primary light having been reflected by the second surface and having passed the second pinhole through the path of the second multi-order light from among the intensities of the plurality of light that the acquisition unit acquires, in a state where the reference member is disposed between the first head unit and the second head unit.

In the confocal displacement sensor, when adjusting the optical axes of the first and second optical members, the first intensity information is displayed on the display unit in a state where the reference member is disposed between the first head unit and the second head unit. Therefore, the user can easily and accurately adjust the posture of the first head unit so that the optical axis of the first optical member is orthogonal to the first surface of the reference member while visually recognizing the first intensity information.

In addition, the second intensity information is displayed on the display unit in a state where the reference member is disposed between the first head unit and the second head unit. Therefore, the user can easily and accurately adjust the posture of the second head unit so that the optical axis of the second optical member is orthogonal to the second surface of the reference member while visually recognizing the second intensity information.

As described above, the user can align the optical axes of the first and second optical members by adjusting the postures of the first and second head units and adjusting the relative positional relationship between the first and second head units.

As a result, the user can measure the thickness of the measurement object with high accuracy after adjusting the optical axes of the first and second optical members.

(14) The first intensity information is a value based on a difference between a maximum intensity value and a minimum intensity value among a plurality of intensities of a plurality of first determination light corresponding to the first head unit, and the second intensity information is a value based on a difference between a maximum intensity value and a minimum intensity value among a plurality of intensities of a plurality of second determination light corresponding to the second head unit.

In this case, the posture of the first head unit can be adjusted based on the difference between the maximum intensity value and the minimum intensity value among the plurality of intensities of the plurality of first determination light. Further, the posture of the second head unit can be adjusted based on the difference between the maximum intensity value and the minimum intensity value among the plurality of intensities of the plurality of second determination light.

(15) The confocal displacement sensor may have a measurement mode for measuring the measurement object and an optical axis adjustment mode for adjusting the optical axis of the head unit.

In this case, the measurement of the measurement object is performed by operating the confocal displacement sensor in the measurement mode. The optical axis of the head unit is adjusted by operating the confocal displacement sensor in the optical axis adjustment mode.

According to the present invention, it is possible to provide a confocal displacement sensor capable of easily and accurately adjusting a posture of a measurement head unit so that a measurement of a measurement object can be performed with high accuracy.

DESCRIPTION OF EMBODIMENTS

Hereinafter, a confocal displacement sensor according to an embodiment of the present invention will be described with reference to the drawings.

First Embodiment (1) Basic Configuration of Confocal Displacement Sensor

Figure 1:
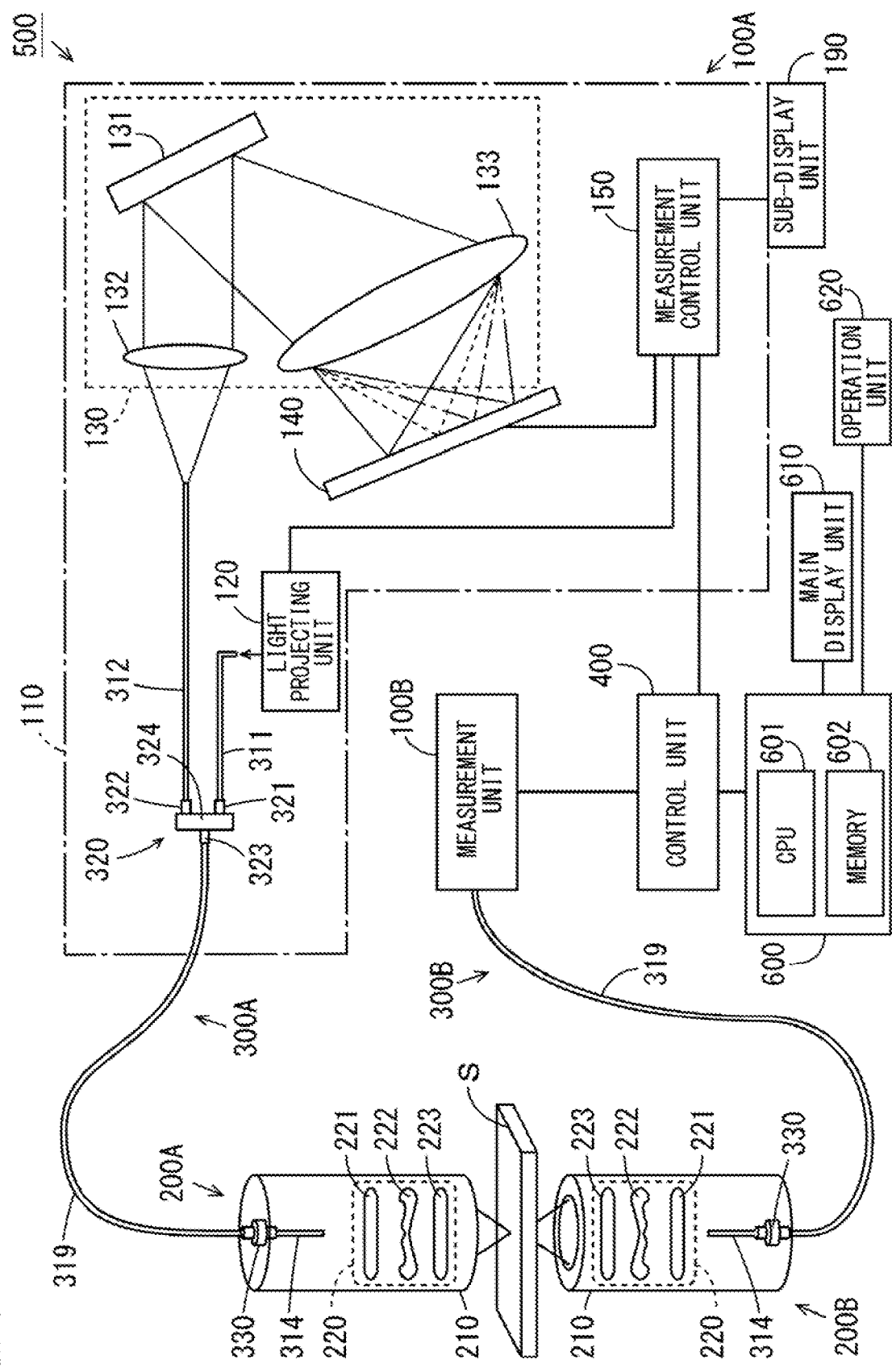
FIG. 1 is a schematic diagram illustrating a configuration of a confocal displacement sensor according to a first embodiment.

FIG. 1 is a schematic diagram illustrating a configuration of the confocal displacement sensor according to the first embodiment. As shown in FIG. 1, the confocal displacement sensor 500 includes measurement units 100A and 100B, measurement heads 200A and 200B, light guiding units 300A and 300B, a control unit 400, and a personal computer (PC) 600. The light guiding unit 300A includes a plurality of optical fibers, and optically connects the measurement unit 100A and the measurement head 200A.

The measurement unit 100A includes a housing 110, a light projecting unit 120, a spectroscopic unit 130, a light receiving unit 140, a measurement control unit 150, and a sub-display unit 190. The housing 110 accommodates the light projecting unit 120, the spectroscopic unit 130, the light receiving unit 140, and the measurement control unit 150. The sub-display unit 190 includes a display such as a seven-segment display or a dot matrix display, and is attached to the housing 110. The light projecting unit 120 is configured to be capable of emitting a light having a wide wavelength band (for example, 500 nm to 700 nm), that is, light having a plurality of wavelengths. The light emitted by the light projecting unit 120 is input to an optical fiber 311 of the light guiding unit 300A, which will be described later.

The spectroscopic unit 130 includes a diffraction grating 131 and a plurality of lenses 132 and 133 (in the embodiment, two). As will be described later, a part of the light emitted by the light projecting unit 120 and reflected by a surface of a measurement object S is output from an optical fiber 312 of the light guiding unit 300A, which will be described later. The light output from the optical fiber 312 is substantially paralleled by passing through the lens 132, and is incident on the diffraction grating 131. In the present embodiment, the diffraction grating 131 is a reflection type diffraction grating. The light incident on the diffraction grating 131 is divided so as to be reflected at a different angle for each wavelength, and is focused on different positions in one dimension for each wavelength by passing through the lens 133.

The light receiving unit 140 includes an imaging element (one-dimensional line sensor) in which a plurality of pixels are arranged in a one-dimensional manner. The imaging element may be a multi-division photodiode (PD), chargecoupled device (CCD) camera, or complementary metal-oxide-semiconductor (CMOS) image sensor, or may be another device. The light receiving unit 140 is arranged such that a plurality of pixels of the imaging element respectively receive a light at a plurality of focus positions which are different for each wavelength and formed by the light passing through the lens 133 of the spectroscopic unit 130. An analog electric signal (hereinafter referred to as a light receiving signal) corresponding to the amount of the received light is output from each pixel of the light receiving unit 140. The light receiving signal indicates the intensity of the light received by each pixel.

The measurement control unit 150 includes a central processing unit (CPU), a memory, or a microcomputer. The measurement control unit 150 stores a control program and various data such as measurement conditions used for displacement measurement. These data are provided from the control unit 400, which will be described later. The measurement control unit 150 controls the light projecting unit 120 and the light receiving unit 140 based on the stored control program and data, and calculates a displacement of the surface of the measurement object S based on the light receiving signal output from the light receiving unit 140. The measurement control unit 150 displays the calculation result of the displacement on the sub-display unit 190.

The measurement control unit 150 is connected to the control unit 400, and the control unit 400 is further connected to the PC 600. The measurement control unit 150 provides the calculation result of the displacement and the light receiving signal output from the light receiving unit 140 to the control unit 400. The configuration and operation of the control unit 400 and the PC 600 will be described later.

The measurement head 200 includes a housing 210 having an axially symmetrical shape (in the embodiment, a cylindrical shape), an optical fiber 314, and a lens unit 220. The housing 210 accommodates the optical fiber 314 and the lens unit 220.

A fiber connector 330 (to be described later) of the light guiding unit 300A is attached to one end of the housing 210. The optical fiber 314 is connected to the fiber connector 330 within the housing 210. The light is guided from a processing apparatus 100 to the optical fiber 314 through the light guiding unit 300A. The light guided to the optical fiber 314 is output from the optical fiber 314 in the housing 210 and guided to the lens unit 220.

The lens unit 220 includes a refraction lens 221, a diffraction lens 222, and an objective lens 223. The light guided to the lens unit 220 passes through the refraction lens 221 and the diffraction lens 222 in this order. As a result, chromatic aberration is generated in the light along the optical axis direction. The objective lens 223 is disposed such that the light having chromatic aberration can be focused at a position near the surface of the measurement object S.

The light guiding unit 300A includes a plurality of optical fibers 311, 312, and 319 (in the embodiment, three), a fiber coupler 320, and the fiber connector 330. In the example of FIG. 1, the fiber coupler 320 is provided in the housing 110 of the measurement unit 100A. The fiber connector 330 is attached to the housing 210 of the measurement head 200.

The fiber coupler 320 has a so-called 1×2 type configuration, and includes three ports 321 to 323 and a main body 324. The ports 321 and 322 and the port 323 are connected to the main body 324 so as to face each other with the main body 324 interposed therebetween. The light input to at least one port of the ports 321 and 322 is output from the port 323. The light input to the port 323 is output from each of the ports 321 and 322.

The optical fibers 311 and 312 are connected to the ports 321 and 322 of the fiber coupler 320, respectively. The port 323 of the fiber coupler 320 and the fiber connector 330 are connected by an optical fiber 319.

According to this configuration, the light emitted by the light projecting unit 120 of the measurement unit 100A is input to the port 321 of the fiber coupler 320 through the optical fiber 311. The light input to the port 321 is output from the port 323 and input to the fiber connector 330 through the optical fiber 319. The light input to the fiber connector 330 passes through the optical fiber 314 and the lens unit 220 to be emitted to the measurement object S.

Part of the light reflected by the surface of the measurement object S is input to the fiber connector 330 through the lens unit 220 and the optical fiber 314. The light input to the fiber connector 330 is input to the port 323 of the fiber coupler 320 through the optical fiber 319. The light input to the port 323 is output from the ports 321 and 322. The light output from the port 322 is guided to the spectroscopic unit 130 through the optical fiber 312. Thus, the displacement of the measurement object S is calculated based on the light emitted from the measurement unit 100A to the measurement object S.

The measurement unit 100A and the measurement unit 100B have the same configuration, the measurement head 200A and the measurement head 200B have the same configuration, and the light guiding unit 300A and the light guiding unit 300B have the same configuration. The measurement unit 100B and the measurement head 200B are optically connected by the light guiding unit 300B, similarly to the example of the measurement unit 100A and the measurement head 200A described above. The measurement control unit 150 (not illustrated) of the measurement unit 100B is connected to the control unit 400.

The light emitted from the light projecting unit 120 (not illustrated) of the measurement unit 100B is emitted to the measurement object S through the measurement head 200B. Part of the light reflected by the surface of the measurement object S is returned to the measurement unit 100B through the measurement head 200B. Thereby, the displacement of the measurement object S is calculated based on the light emitted from the measurement unit 100B to the measurement object S. In this case, the measurement control unit 150 (not illustrated) provided in the measurement unit 100B provides the calculation result of the displacement and the light receiving signal output from the light receiving unit 140 to the control unit 400.

The control unit 400 includes a CPU and a memory or a microcomputer. The measurement condition of the displacements in the measurement units 100A and 100B, for example, is input from the PC 600 to the control unit 400. The measurement conditions include, for example, the light emission amount in the light projecting unit 120, the light emission timing in the light projecting unit 120, and the exposure amount in the light receiving unit 140. The control unit 400 provides the input measurement conditions to the measurement control unit 150 of each of the measurement units 100A and 100B. Thereby, in each of the measurement units 100A and 100B, the measurement operation is performed based on the provided measurement condition.

The PC 600 includes a CPU 601 and a memory 602. The memory 602 stores a thickness measurement program and various data used for the thickness measurement. When the CPU 601 executes the thickness measurement program stored in the memory 602, the PC 600 operates in the measurement mode and the optical axis adjustment mode. The calculation results of the displacements and the light receiving signal provided from the respective measurement units 100A and 100B to the control unit 400 are provided to the PC 600 from the control unit 400.

A main display unit 610 and an operation unit 620 are connected to the PC 600. The main display unit 610 includes, for example, a display device such as an organic electroluminescence (EL) panel or a liquid crystal display panel. The operation unit 620 includes a keyboard and a pointing device. The pointing device includes a mouse, a joystick, or the like. The user can switch the operation mode of the PC 600 between the measurement mode and the optical axis adjustment mode by operating the operation unit 620.

In the confocal displacement sensor 500 according to the present embodiment, as shown in FIG. 1, the measurement heads 200A and 200B are disposed so as to face each other with the measurement object S interposed therebetween. The measurement object S has one surface and the other surface opposite to each other. In this state, if the distance between the measurement heads 200A and 200B (hereinafter referred to as the head-to-head distance) is known, the thickness of the measurement object S can be calculated based on the displacements of the one surface and the other surface of the measurement object S measured by the measurement units 100A and 100B and the head-to-head distance.

In the measurement mode, the thickness of the measurement object S disposed between the measurement units 100A and 100B is measured. In the measurement mode, the CPU 601 receives the head-to-head distance input by the user operating the operation unit 620. In addition, the CPU 601 commands the measurement units 100A and 100B to measure displacements through the control unit 400. Then, the CPU 601 calculates the thickness of the measurement object S based on the received head-to-head distance and the calculation results of the displacements provided from the measurement heads 200A and 200B, and displays the calculated thickness on the main display unit 610 as the measurement result.

As described above, when measuring the thickness of the measurement object S, it is necessary to make an optical axis of the lens unit 220 of the measurement head 200A align with an optical axis of the lens unit 220 of the measurement head 200B. In the following description, the optical axis of the lens unit 220 of the measurement head 200A is referred to as an optical axis of the measurement head 200A, and the optical axis of the lens unit 220 of the measurement head 200B is referred to as an optical axis of the measurement head 200B.

Figure 2:
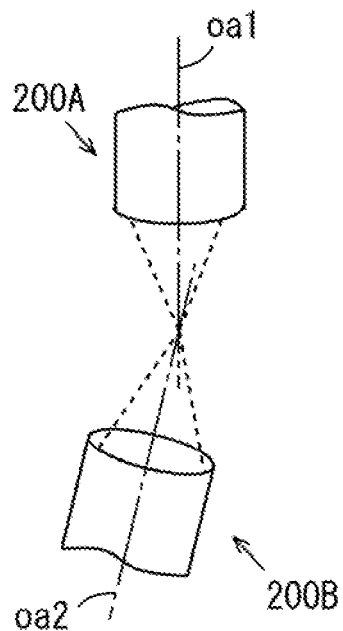
FIG. 2 is a schematic diagram illustrating an example of a case where the optical axes of measurement heads do not align with each other when measuring a thickness of a measurement object.

FIG. 2 is a schematic diagram illustrating an example of a case where the optical axes of the measurement heads 200A and 200B do not align with each other when measuring the thickness of the measurement object S. In the case of FIG. 2, an optical axis oa2 of the measurement head 200B is inclined with respect to an optical axis oa1 of the measurement head 200A, and the optical axes oa1 and oa2 do not align (match) with each other. In this case, the thickness of the measurement object S is measured in a direction inclined with respect to the thickness direction of the measurement object S. Therefore, the measurement accuracy of the thickness of the measurement object S is lowered.

Figure 3:
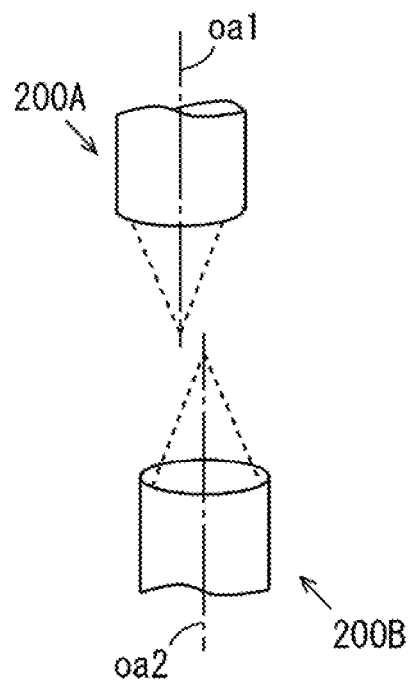
FIG. 3 is a schematic diagram illustrating another example of a case where the optical axes of the measurement heads do not align with each other when measuring the thickness of the measurement object.

FIG. 3 is a schematic diagram showing another example in which the optical axes of the measurement heads 200A and 200B do not align with each other when measuring the thickness of the measurement object S. In the embodiment of FIG. 3, the optical axis oa1 of the measurement head 200A and the optical axis oa2 of the lens unit 220 of the measurement head 200B are parallel to each other, but are separated from each other. In this case, the measurement positions of the displacements by the measurement heads 200A and 200B are shifted in the directions parallel to the one surface and the other surface of the measurement object S. Therefore, the measurement accuracy of the thickness of the measurement object S is lowered.

In the optical axis adjusting mode, the optical axes oa1 and oa2 of the measurement heads 200A and 200B facing each other are adjusted prior to the measurement of the thickness of the measurement object S in the measurement mode. Details of the optical axis adjustment of the measurement heads 200A and 200B will be described later.

(2) Operating Principle

Figure 4:
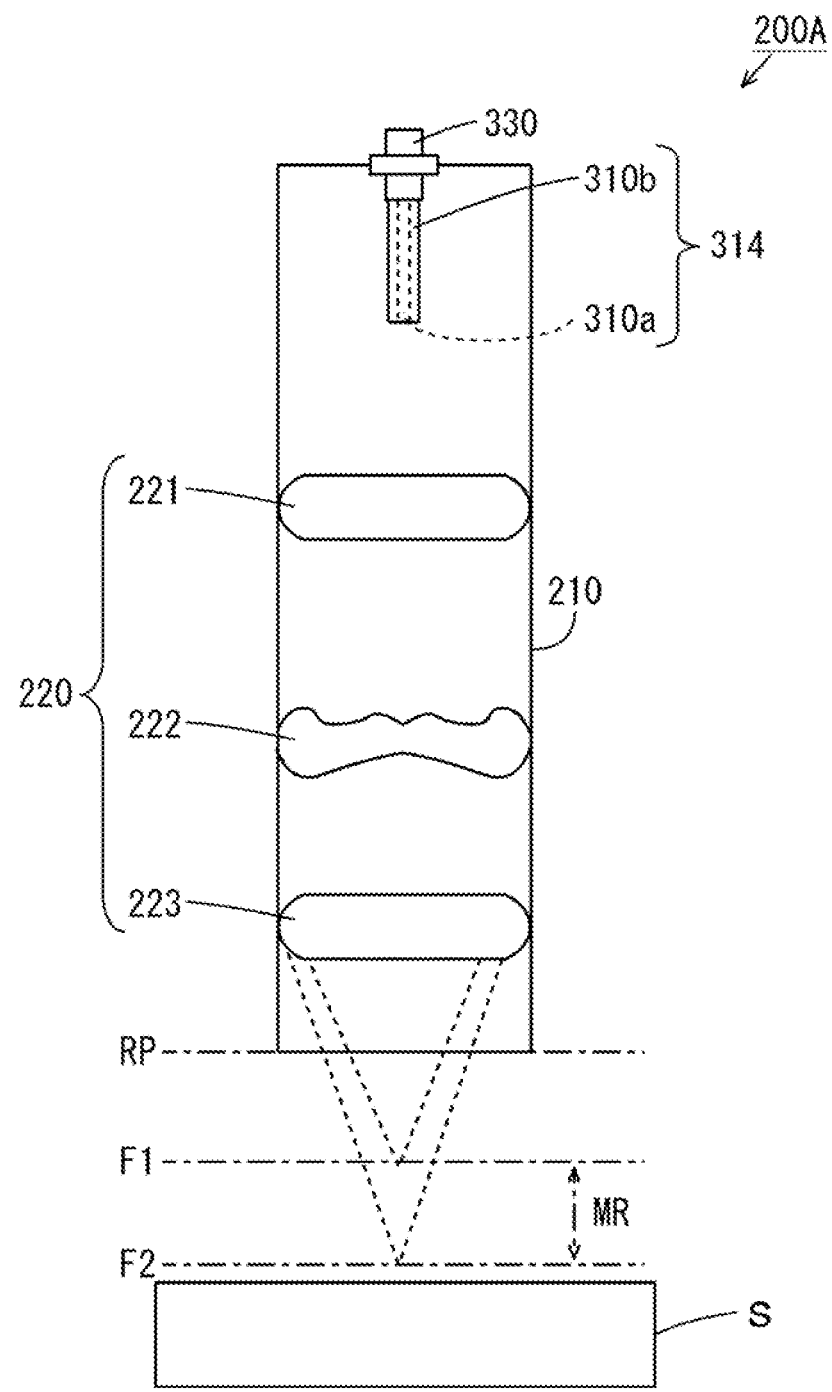
FIG. 4 is a diagram for explaining an operation principle of the confocal displacement sensor using the measurement head of FIG. 1.

Here, an operation principle of the confocal displacement sensor 500 using the measurement heads 200A and 200B of FIG. 1 will be described. An example of the measurement head 200A will be described as a representative thereof. FIG. 4 is a diagram for explaining the operation principle of the confocal displacement sensor 500 using the measurement head 200A of FIG. 1. As shown in FIG. 4, the optical fiber 314 includes a core 310a and a cladding 310b. The core 310a is covered with the cladding 310b. The light input to one end of the core 310a is output from the other end of the core 310a.

The light output from the optical fiber 314 passes through the refraction lens 221 and the diffraction lens 222. As a result, chromatic aberration is generated in the light. The light having chromatic aberration are focused at a different position for each wavelength by passing through the objective lens 223. For example, a light having a short wavelength is focused at a position close to the objective lens 223, and a light having a long wavelength is focused at a position far from the objective lens 223. The range between a focus position F1 closest to the objective lens 223 and a focus position F2 farthest from the objective lens 223 is a measurement range MR.

When the surface of the measurement object S exists in the measurement range MR, the light that has passed through the objective lens 223 is emitted onto the surface of the measurement object S, and then is reflected in a wide range by the surface. Here, in the present embodiment, the distal end portion of the optical fiber 314 functions as a spatial filter having a minute pinhole.

A light having a specific wavelength focused at the position of the surface of the measurement object S passes through the lens unit 220 by being reflected by the surface, and is input to the tip portion of the core 310a of the optical fiber 314. The wavelength of the light input to the optical fiber 314 indicates the measurement distance. Here, the measurement distance is a distance from a predetermined reference position RP to the position of the surface of the measurement object S. In this example, the reference position RP is the position of an end portion of the housing 210 closest to the measurement object S.

The light input to the optical fiber 314 is guided to the measurement unit 100A in FIG. 1, is split by the diffraction grating 131, and is focused by the lens 133 at a different position for each wavelength. The plurality of pixels of the light receiving unit 140 are respectively arranged at positions where a plurality of light having different wavelength are focused. Therefore, each pixel of the light receiving unit 140 receives a light having a wavelength corresponding to the pixel, and outputs a light receiving signal.

In the measurement control unit 150 of FIG. 1, a conversion formula of the position of the pixel of the light receiving unit 140, a wavelength of a peak in a waveform of the light receiving signal, and the measurement distance is stored in advance. The measurement control unit 150 specifies the position of the pixel of the light receiving unit 140 where the light receiving signal indicating a peak value is output, and calculates the measurement distance based on the specified position of the pixel and the conversion formula stored in advance. In addition, the measurement control unit 150 calculates the displacement of the surface of the measurement object S based on the calculated measurement distance.

(3) Path of Light Formed by Diffraction Lens 222

In the lens unit 220 of FIG. 4 used in the measurement heads 200A and 200B, a path of a diffracted light, each of which has a different diffraction order for each wavelength of a light passing through the diffraction lens 222, is formed by the diffraction lens 222.

Figure 5A:
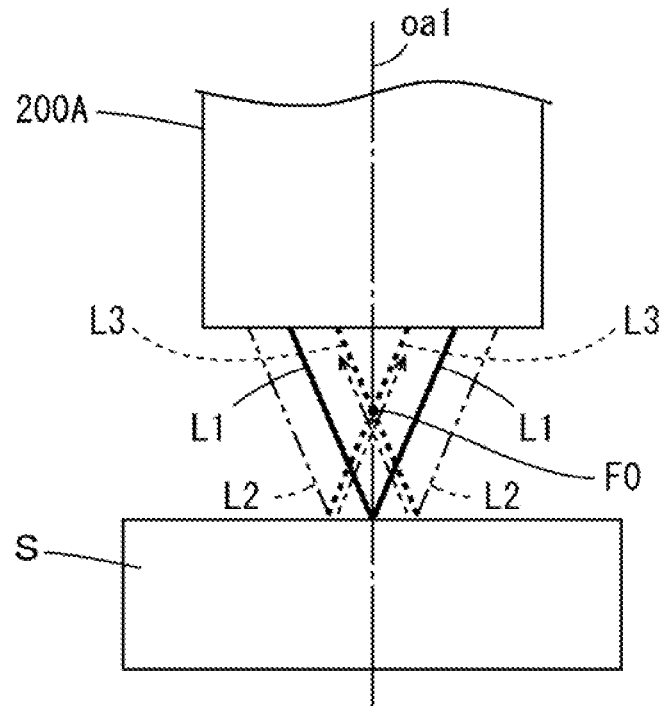
FIG. 5A is a diagram illustrating an example of a traveling path of light having a plurality of wavelengths when the optical axis of the measurement head is orthogonal to the surface of the measurement object.
Figure 5B:
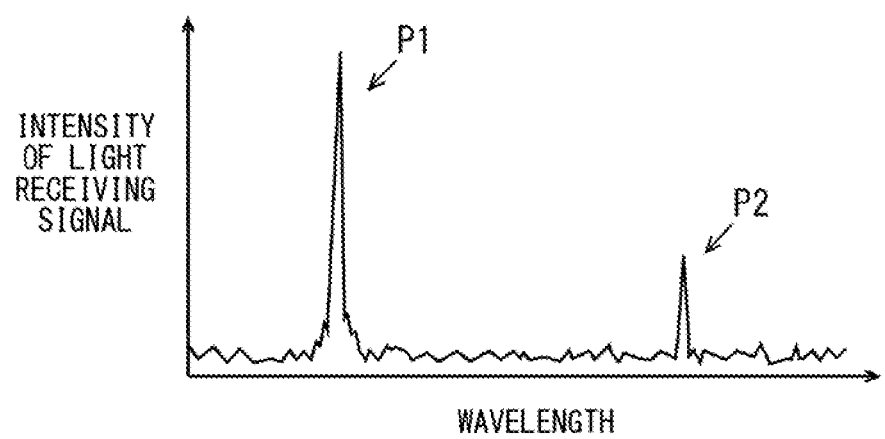
FIG. 5B is a diagram illustrating an example of a waveform of a light receiving signal acquired when the measurement head and the measurement object are in the positional relationship of FIG. 5A.

FIG. 5A is a diagram illustrating an example of a traveling path of light having a plurality of wavelengths when the optical axis oa1 of the measurement head 200A is orthogonal to the surface of the measurement object S, and FIG. 5B is a diagram illustrating an example of the waveform of the light receiving signal acquired when the measurement head 200A and the measurement object S are in the positional relationship of FIG. 5A.

Light having a plurality of wavelengths is emitted onto the surface of the measurement object S by the measurement head 200A. For the light having each wavelength, there is a primary light and a plurality of a multi-order light (such as a secondary light and a tertiary light). In the example of FIG. 5A, as indicated by a thick solid line, out of the lights having a plurality of wavelengths emitted to the surface of the measurement object S, when the primary light L1 focused on the surface of the measurement object S is reflected by the surface of the measurement object S, the reflected primary light L1 is input to the optical fiber 314 of FIG. 4. Most of the primary light having a wavelength different from that of the primary light L1 is not input to the optical fiber 314 of FIG. 4.

As shown by a two-dot chain line in FIG. 5A, the primary light L2 having a wavelength different from that of the primary light L1 is not focused on the surface of the measurement object S, but is focused at a position lower than the surface of the measurement object S. As indicated by a thick dotted line in FIG. 5A, the multi-order light L3 having the same wavelength as the primary light L2 is not focused on the surface of the measurement object S, but is focused at a position F0 above the surface of the measurement object S. In this case, assuming that the multi-order light L3 is reflected at the position F0, the reflected light is input to the optical fiber 314. Therefore, when the primary light L2 reflected by the surface of the measurement object S passes through a path of the multi-order light L3, the primary light L2 is input to the optical fiber 314.

As a result, as shown in FIG. 5B, a peak P1 caused by the primary light L1 and a peak P2 caused by the primary light L2 appear in the waveform of the light receiving signal of the light input from the measurement object S to the optical fiber 314. The intensity of the peak P2 is lower than that of the intensity of the peak P1.

In the present embodiment, the lens unit 220 of the measurement head 200A is configured such that when the surface of the measurement object S is located within the measurement range MR and the optical axis oa1 of the measurement head 200A is orthogonal to the surface of the measurement object S, the peak P2 caused by the primary light L2 input to the optical fiber 314 through the path of the multi-order light L3 appears in the waveform of the light receiving signal.

The peak P2 of the primary light L2 input to the optical fiber 314 through the path of the multi-order light L3 appears as the waveform of the light receiving signal when, for example, an angle of the optical axis oa1 of the measurement head 200A with respect to the surface of the measurement object S is within 90°±0.2°.

Figure 6A:
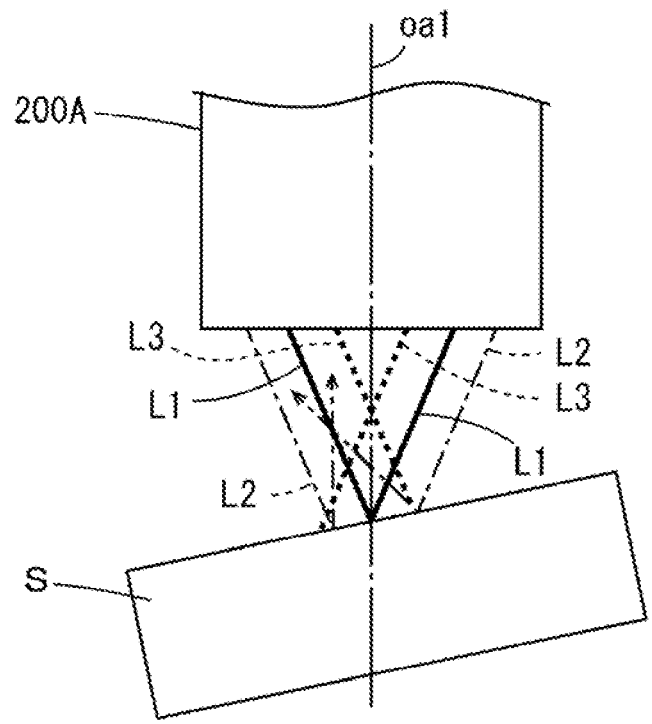
FIG. 6A is a diagram illustrating an example of a traveling path of light having a plurality of wavelengths when the optical axis of the measurement head is not orthogonal to the surface of the measurement object.
Figure 6B:
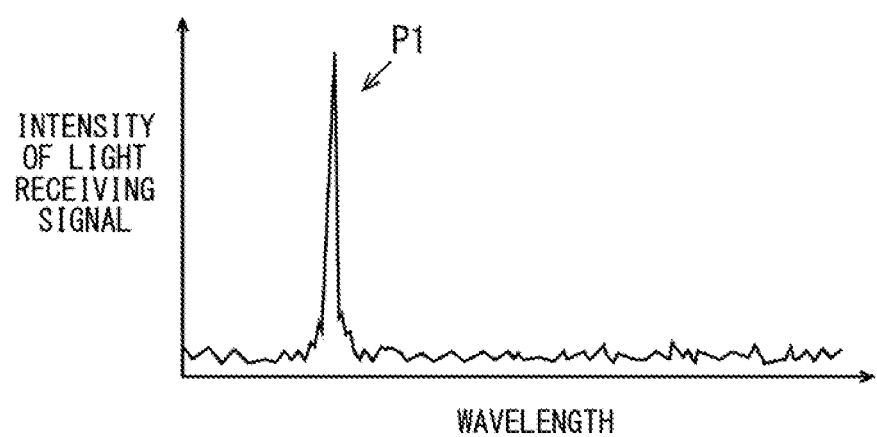
FIG. 6B is a diagram illustrating an example of the waveform of the light receiving signal acquired when the measurement head and the measurement object are in the positional relationship of FIG. 6A.

FIG. 6A is a diagram illustrating an example of a traveling path of light having a plurality of wavelengths when the optical axis oa1 of the measurement head 200A is not orthogonal to the surface of the measurement object S, and FIG. 6B is a diagram illustrating an example of the waveform of the light receiving signal acquired when the measurement head 200A and the measurement object S are in the positional relationship of FIG. 6A.

In this example, as in the example of FIG. 5A, out of the light having plurality of wavelengths emitted to the surface of the measurement object S, when the primary light L1 focused on the surface of the measurement object S is reflected by the surface of the measurement object S, the reflected primary light L1 is input to the optical fiber 314 of FIG. 4.

However, as shown by the two-dot chain line in FIG. 6A, the primary light L2 does not pass through the path of the multi-order light L3, unlike the example in FIG. 5A. Therefore, the primary light L2 is not input to the optical fiber 314 in FIG. 4.

As a result, as shown in FIG. 6B, only the peak P1 caused by the primary light L1 appears in the waveform of the light receiving signal of the light input from the measurement object S to the optical fiber 314, and the peak P2 caused by the primary light L2 does not appear.

As described above, when the optical axis oa1 of the measurement head 200A is orthogonal to the surface of the measurement object S, the waveforms of the light receiving signal including the peak P2 of the primary light L2 input to the optical fiber 314 through the path of the multi-order light L3 are acquired. The peak value (intensity) of the peak P2 is highest when the optical axis oa1 of the lens unit 220 is orthogonal to the surface of the measurement object S, and decreases as the degree of orthogonality of the optical axis oa1 of the lens unit 220 with respect to the surface of the measurement object S decreases. Therefore, in the present embodiment, the primary light L2 input to the optical fiber 314 through the path of the multi-order light L3 is used as the determination light indicating the degree of orthogonality of the optical axis oa1 of the lens unit 220 with respect to the front surface of the measurement object S.

(4) Optical Axes Adjustment of Measurement Heads 200A and 200B

In the present embodiment, a reference member is used to adjust the optical axes of the measurement heads 200A and 200B. The reference member has a flat plate shape and has a first surface and a second surface parallel to each other and opposite to each other. In this embodiment, the thickness of the reference member, that is, the distance between the first surface and the second surface, is set to be equal to or approximately equal to the measurement range MR (FIG. 4) of the measurement heads 200A and 200B.

The reference member is disposed between the measurement heads 200A and 200B such that the light emitting unit of the measurement head 200A faces the first surface and the light emitting unit of the measurement head 200B faces the second surface. In this state, the optical axes of the measurement heads 200A and 200B are adjusted based on the light receiving signal of the determination light acquired by emitting the light from the measurement heads 200A and 200B to the first and second surfaces of the reference member, respectively.

Figure 7A:
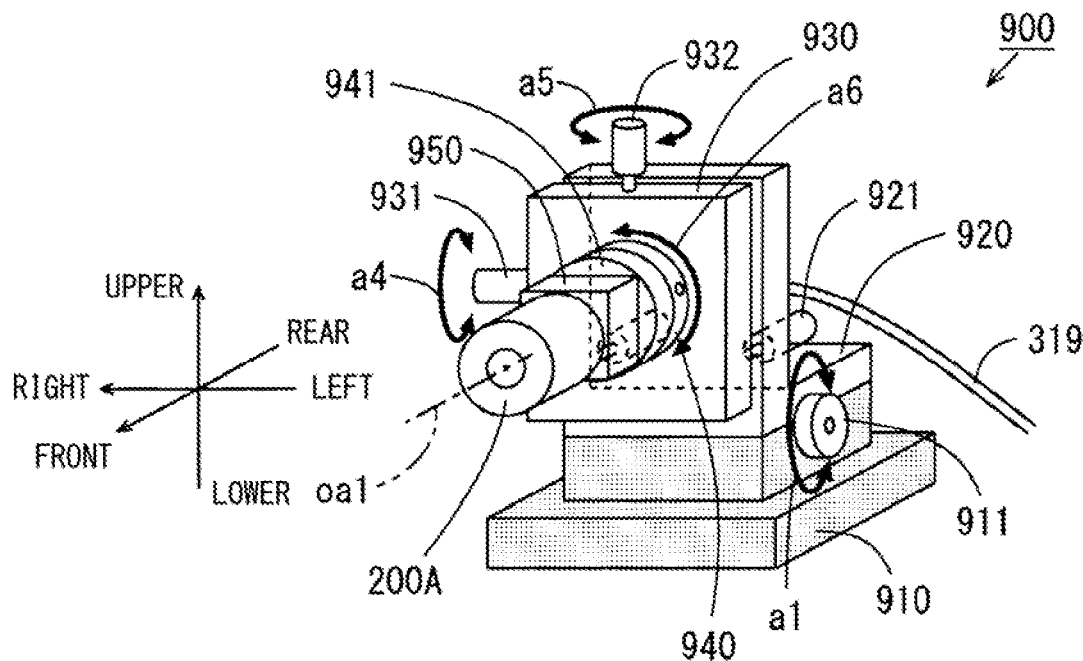
FIG. 7A and 7B are diagrams illustrating an example of a holding device capable of holding the measurement head.
Figure 7B:
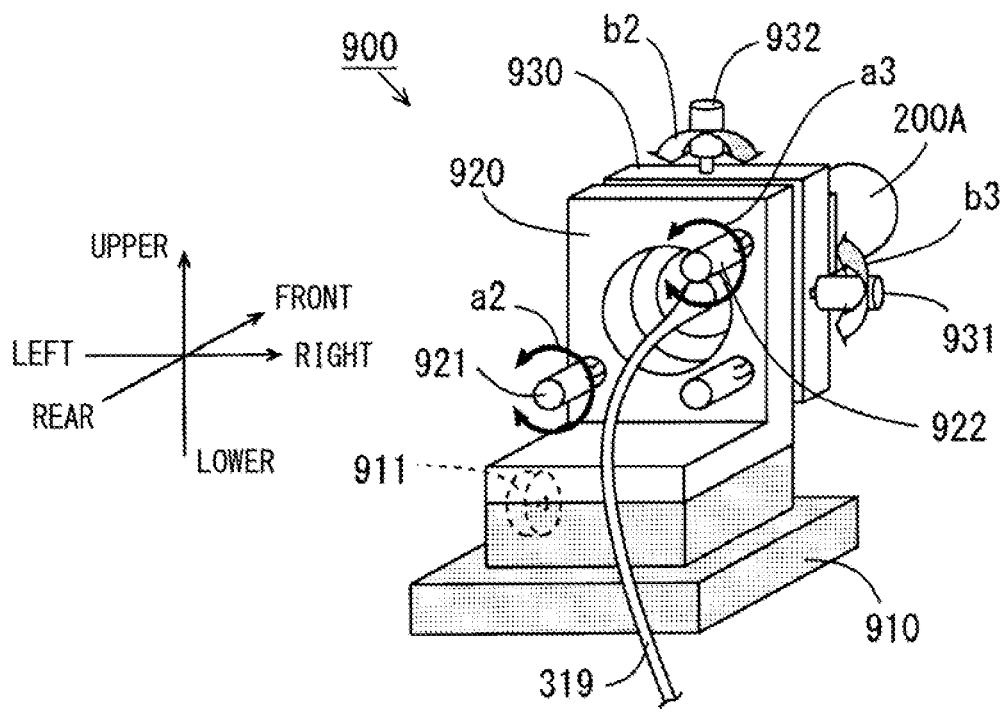

In the present embodiment, a holding device for holding the measurement heads 200A and 200B is used for adjusting the optical axes of the measurement heads 200A and 200B. FIG. 7 is a diagram illustrating an example of a holding device capable of holding the measurement heads 200A and 200B. FIG. 7A is an external perspective view of a holding device 900 for holding the measurement head 200A, as seen obliquely from the front and from above. FIG. 7B is an external perspective view of the holding device 900 for holding the measurement head 200A as viewed obliquely from the rear and from above.

As shown in FIGS. 7A and 7B, in the holding device 900 of the present example, a first supporting member 920 is provided on a pedestal 910 that is movable in a front-rear direction of the holding device 900. A second supporting member 930 is provided at a front portion of the first supporting member 920 so as to be swingable about a horizontal axis extending in a horizontal direction and swingable about a vertical axis with respect to the first supporting member 920.

A third supporting member 940 is provided at the center of the second supporting member 930 so as to be movable in the vertical direction and the horizontal direction with respect to the second supporting member 930. The third supporting member 940 has a cylindrical shape and extends in the front-rear direction. A holding member 950 is provided at a front portion of the third supporting member 940 so as to be rotatable about a central axis of the third supporting member 940. The measurement head 200A is held by the holding member 950.

The pedestal 910 is provided with a front-rear position knob 911 for moving the first supporting member 920 in the front-rear direction with respect to the pedestal 910. The user operates the front-rear position knob 911 as indicated by a thick arrow a1 in FIG. 7A. As a result, the measurement head 200A moves in the front-rear direction.

The first supporting member 920 is provided with a vertical angle knob 921 for vertically swinging the second supporting member 930 with respect to the first supporting member 920. The user operates the vertical angle knob 921 as indicated by a thick arrow a2 in FIG. 7B. As a result, the posture (orientation) of the measurement head 200A is changed in the vertical direction as indicated by an outlined arrow b2 in FIG. 7B.

The first supporting member 920 is provided with a horizontal angle knob 922 for swinging the second supporting member 930 in the horizontal direction with respect to the first supporting member 920. The user operates the horizontal angle knob 922 as indicated by a thick arrow a3 in FIG. 7B. As a result, the posture (orientation) of the measurement head 200A is changed in the horizontal direction as indicated by an outlined arrow b3 in FIG. 7B.

The second supporting member 930 is provided with a vertical position knob 931 for moving the third supporting member 940 in the vertical direction with respect to the second supporting member 930. The user operates the vertical position knob 931 as indicated by a thick arrow a4 in FIG. 7A. As a result, the measurement head 200A moves in the vertical direction.

The second supporting member 930 is provided with a horizontal position knob 932 for moving the third supporting member 940 in the horizontal direction with respect to the second supporting member 930. The user operates the horizontal position knob 932 as indicated by a thick arrow a5 in FIG. 7A. As a result, the measurement head 200A moves in the horizontal direction.

The third supporting member 940 is provided with a shaft rotation dial 941 for rotating the holding member 950 about the central axis of the third supporting member 940 with respect to the third supporting member 940. The user operates the shaft rotation dial 941 as indicated by a thick arrow a6 in FIG. 7A. As a result, the measurement head 200A rotates about the optical axis oa1 thereof.

After preparing the reference member and the holding device 900, the user operates the operation unit 620 of FIG. 1 to operate the PC 600 of FIG. 1 in the optical axis adjustment mode. As a result, in the main display unit 610 of FIG. 1, a plurality of guidance screens including an image indicating a content of an operation to be performed for the optical axis adjustment and information indicating a degree of adjustment of the optical axis are sequentially displayed in response to the operation of the operation unit 620 by the user.

FIGS. 8 to 15 are diagrams showing examples of guidance screens sequentially displayed on the main display unit 610 of FIG. 1 when adjusting the optical axes of the measurement heads 200A and 200B.

Figure 8:
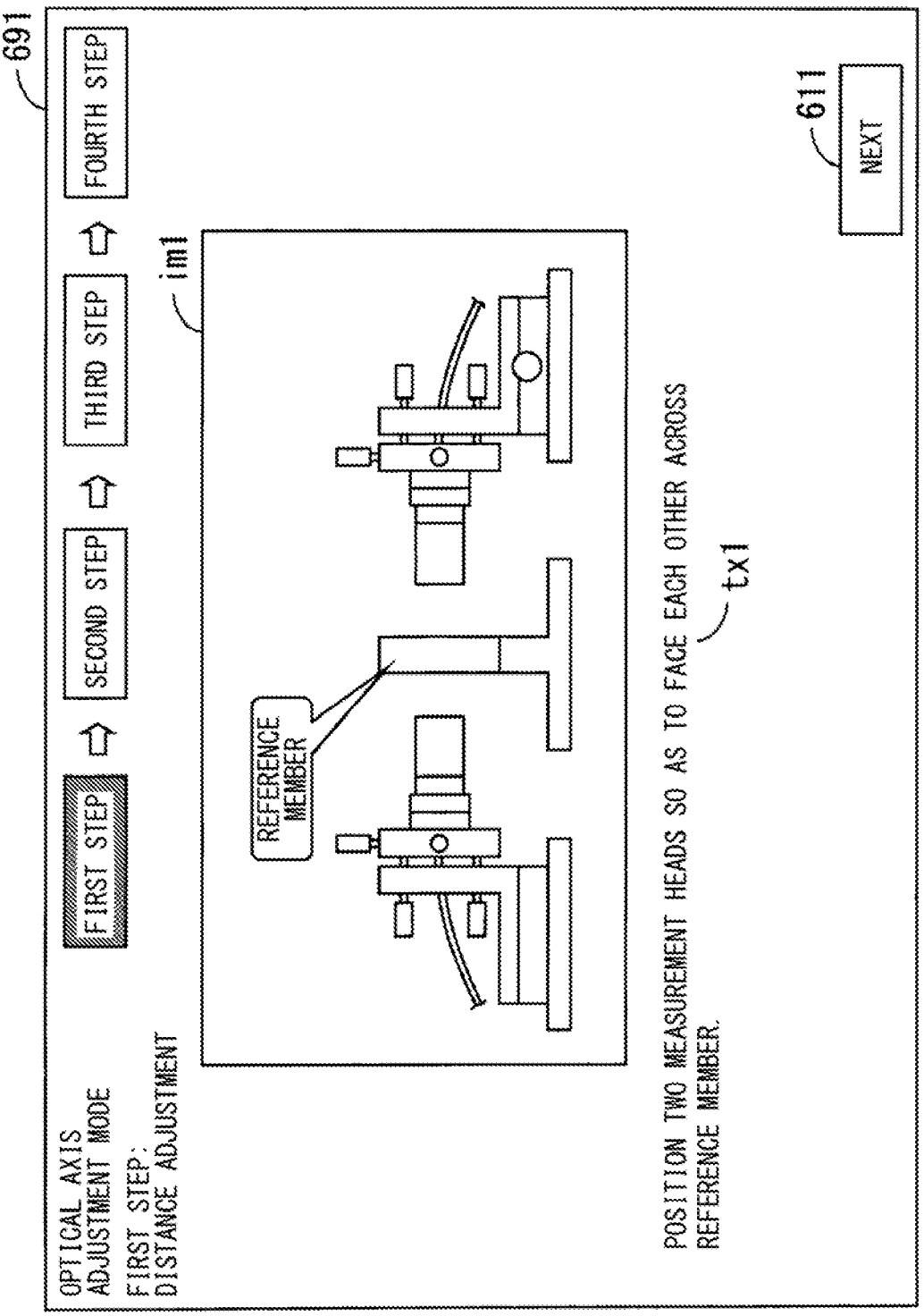
FIG. 8 is a diagram illustrating an example of a guidance screen sequentially displayed on a main display unit of FIG. 1 when adjusting the optical axis of the measurement head.

As shown in FIG. 8, a guidance screen 691 initially displayed on the main display unit 610 includes an initial-state image im1, a first message tx1, and a next button 611. The initial-state image im1 is displayed at the center of the guidance screen 691, and indicates the positional relationship between the measurement heads 200A and 200B and the reference member to be initially set. The first message tx1 is displayed below the initial-state image im1, and includes an operation instruction for arranging the measurement heads 200A and 200B so as to face each other with the reference member interposed therebetween. The next button 611 is displayed on the bottom right corner of a guidance screen 691.

Here, as shown in FIG. 8 and FIGS. 9 to 15 to be described later, images indicating the progress of the optical axis adjustment at the present point in time are displayed on the uppermost portions of the guidance screens 691 to 698 which are sequentially displayed on the main display unit 610 in the optical axis adjustment mode. In the present embodiment, the optical axis adjustment is basically performed in four steps: a first step, a second step, a third step, and a fourth step. Therefore, on the uppermost portions of each of the guidance screens 691 to 698, an index indicating a step corresponding to the guidance screen and an index indicating a step corresponding to another guidance image are displayed in a manner distinguishable from each other. For example, in each of the guidance screens 691 to 698, only the index indicating the step corresponding to the guidance screen is highlighted.

In the first step, the measurement heads 200A and 200B are arranged to face each other with the reference member interposed therebetween, and the distance between the first surface of the reference member and the measurement head 200A and the distance between the second surface of the reference member and the measurement head 200B are adjusted. In the second step, the postures of the measurement heads 200A and 200B are adjusted such that the optical axis oa1 of the measurement head 200A is orthogonal to the first surface of the reference member and the optical axis oa2 of the measurement head 200B is orthogonal to the second surface of the reference member.

In the third step, the relative positional relationship between the measurement heads 200A and 200B are roughly adjusted so that the optical axis oa1 of the measurement head 200A and the optical axis oa2 of the measurement head 200B align or substantially align with each other. In the fourth step, the relative positional relationship between the measurement heads 200A and 200B is finely adjusted so that the optical axis oa1 of the measurement head 200A and the optical axis oa2 of the measurement head 200B precisely align with each other.

In the first step, the user sets the positional relationship between the measurement heads 200A and 200B and the reference member while visually recognizing the guidance screen 691 shown in FIG. 8, and then operates the next button 611 shown in FIG. 8 using the operation unit 620 shown in FIG. 1. As a result, a guidance screen 692 of FIG. 9 is displayed on the main display unit 610.

Figure 9:
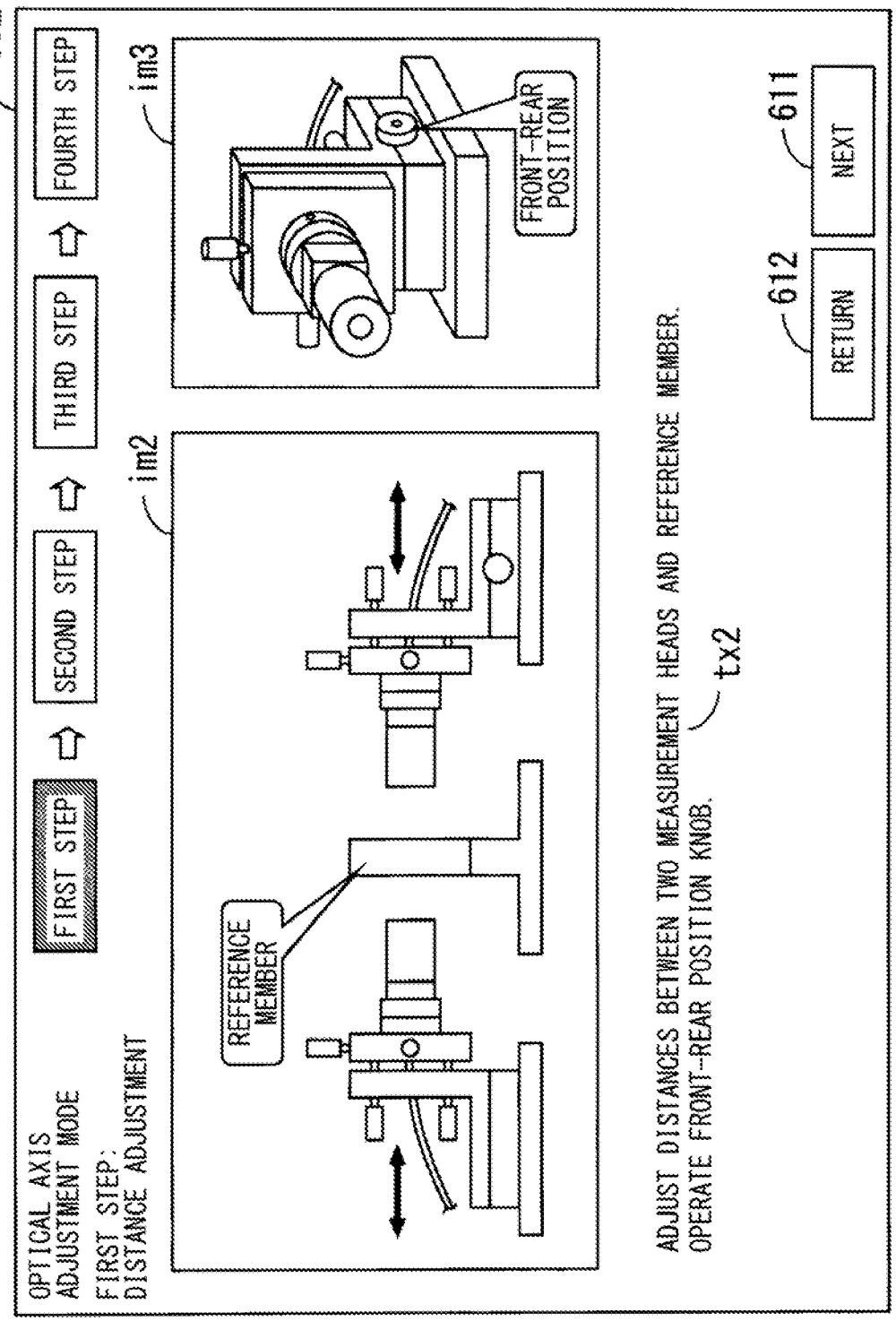
FIG. 9 is a diagram illustrating an example of the guidance screen sequentially displayed on the main display unit of FIG. 1 when adjusting the optical axis of the measurement head.

As shown in FIG. 9, the guidance screen 692 includes a distance adjustment image im2, a holding device image im3, a second message tx2, the next button 611, and a return button 612. The distance adjustment image im2 is displayed on the left side of the guidance screen 692 with respect to the center of the guidance screen 692, and the holding device image im3 is displayed on the right side of the guidance screen 692 with respect to the center of the guidance screen 692. The second messaging tx2 is displayed below the distance adjustment image im2 and the holding device image im3. The next button 611 and the return button 612 are displayed on the bottom right corner of the guidance screen 692.

The distance adjustment image im2 is an image to make the user adjust the distance between the measurement heads 200A and 200B and the reference member, and indicates a state where the measurement heads 200A and 200B are moved in the front-rear direction while facing each other with the reference member interposed therebetween. The second messaging tx2 includes an operation instruction for adjusting the distance between the measurement head 200A and the first surface of the reference member, and the distance between the measurement head 200B and the second surface of the reference member. In the holding device imaging im3, the position of the front-rear position knob 911 (FIG. 7) of the holding device 900 (FIG. 7) to be operated during the adjustment is shown.

Figure 10:
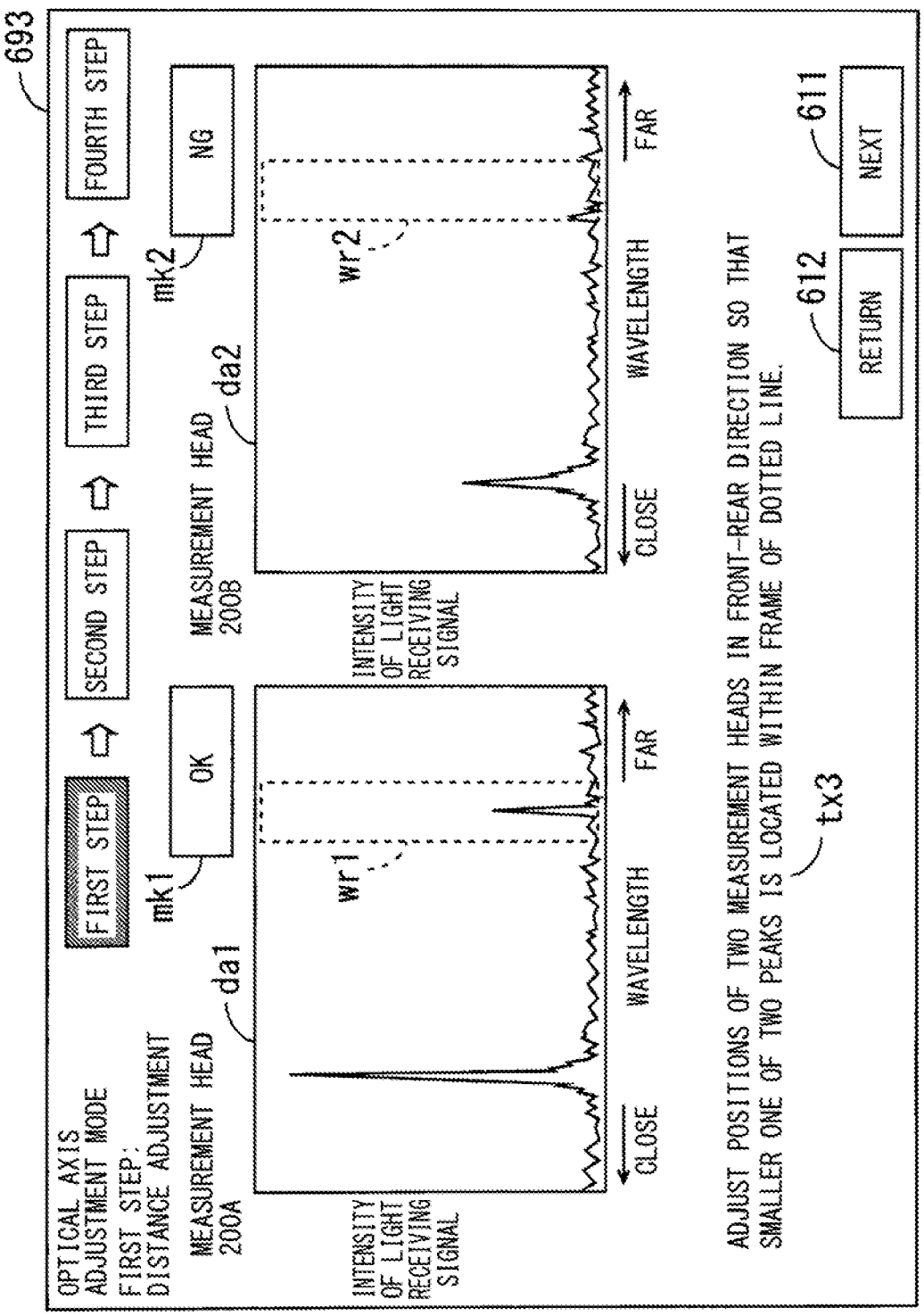
FIG. 10 is a diagram illustrating an example of the guidance screen sequentially displayed on the main display unit of FIG. 1 when adjusting the optical axis of the measurement head.

The user recognizes the content of an operation to be performed by the user and the operation target of the holding device 900 (FIG. 7) by visually recognizing the guidance screen 692 of FIG. 9. Then, the user operates the next button 611 in FIG. 9 using the operation unit 620 in FIG. 1. As a result, a guidance screen 693 of FIG. 10 is displayed on the main display unit 610. At this time, the measurement heads 200A and 200B respectively emit a light to the reference member. By operating the return button 612 of FIG. 9 using the operation unit 620 of FIG. 1, the user can cause the main display unit 610 to display the immediately preceding guidance screen 691 of FIG. 8.

As shown in FIG. 10, the guidance screen 693 includes a waveform display area da1, a waveform display area da2, a third message tx3, the next button 611, and the return button 612.

The waveform display area da1 is displayed on the left side of the guidance screen 693 with respect to the center of the guidance screen 693, and the waveform display area da2 is displayed on the right side of the guidance screen 693 with respect to the center of the guidance screen 693. The third message tx3 is displayed below the waveform display areas da1 and da2. The next button 611 and the return button 612 are displayed on the bottom right corner of the guidance screen 693.

On the waveform display area da1, the vertical axis indicating the strength of the light receiving signal and the horizontal axis indicating the wavelength (wavelength axis) are displayed, and the waveform of the light receiving signal acquired based on the light emitted from the measurement head 200A to the first surface of the reference member is displayed. On the waveform display area da2, the vertical axis indicating the strength of the light receiving signal and the horizontal axis indicating the wavelength (wavelength axis) are displayed, and the waveform of the light receiving signal acquired based on the light emitted from the measurement head 200B to the second surface of the reference member is displayed.

In the waveform display area da1, when the optical axis oat of the measurement head 200A is substantially orthogonal to the first surface, the peak waveform of the primary light focused on the first surface of the reference member and the peak waveform of the determination light are simultaneously displayed. Therefore, the user adjusts the posture and the position of the holding device 900 (FIG. 7) holding the measurement head 200A so that the two peak waveforms are displayed in the waveform display area da1.

In the waveform display area da1, in a state where two peak waveforms are displayed, when the distance between the measurement head 200A and the first surface of the reference member is changed, the positions of the peak waveform of the primary light and the peak waveform of the determination light are changed on the waveform axis.

In the present embodiment, the range of the distance between the measurement head 200A and the reference member to be adjusted when adjusting the optical axis is predetermined as a first distance range. The first distance range is determined to include, for example, a distance from the tip of the measurement head 200A to a predetermined position within the measurement range MR of the measurement head 200A. In the waveform display area da1, when the range of the distance between the measurement head 200A and the first surface of the reference member is in the first distance range, the range of the peak wavelength of the determination light is displayed on the wavelength axis as a first wavelength range wr1.

In the waveform display area da2, when the optical axis oa2 of the measurement head 200B is substantially orthogonal to the second surface, the peak waveform of the primary light focused on the second surface of the reference member and the peak waveform of the determination light are simultaneously displayed. Therefore, the user adjusts the posture and the position of the holding device 900 (FIG. 7) holding the measurement head 200B so that the two peak waveforms are displayed in the waveform display area da2.

In the waveform display area da2, when the distance between the measurement head 200B and the second surface of the reference member is changed while two peak waveforms are displayed, the positions of the peak waveform of the primary light and the peak waveform of the determination light on the waveform axis are changed.

In the present embodiment, the range of the distance between the measurement head 200B and the reference member to be adjusted when adjusting the optical axis is predetermined as a second distance range. The second distance range is determined to include, for example, a distance from the tip of the measurement head 200B to a predetermined position within the measurement range MR of the measurement head 200B. In the waveform display area da2, when the range of the distance between the measurement head 200B and the second surface of the reference member is in the second distance range, the range of the peak wavelength of the determination light is displayed on the wavelength axis as a second wavelength range wr2.

The third message tx3 includes an operation instruction for adjusting the positions of the measurement heads 200A and 200B in the front-rear direction so that a smaller one of the two peaks is located within a frame of a dotted line indicating the first and second wavelength ranges wr1 and wr2.

Therefore, the user operates the front-rear position knob 911 (FIG. 7) of the holding device 900 (FIG. 7) that holds the measurement heads 200A and 200B, respectively, while visually recognizing the waveforms of the light receiving signal displayed in the waveform display areas da1 and da2. Thereby, the user adjusts the distance between the measurement head 200A and the first surface of the reference member. The user also adjusts the distance between the measurement head 200B and the second surface of the reference member.

Here, in the guidance screen 693 of FIG. 10, determination frames mk1 and mk2 are respectively displayed above the waveform display areas da1 and da2. In the determination frame mk1, "OK" is displayed when the peak wavelength of the determination light acquired through the measurement head 200A is located within the first wavelength range wr1 and the peak value of the determination light exceeds a predetermined threshold value, and "NG" is displayed in other cases. In the determination frame mk2, "OK" is displayed when the peak wavelength of the determination light acquired through the measurement head 200B is located within the second wavelength range wr2 and the peak value of the determination light exceeds a predetermined threshold value, and "NG" is displayed in other cases. Therefore, the user can determine whether or not to proceed with the operation of adjusting the optical axis based on the information displayed in the determination frames mk1 and mk2.

After adjusting the distance between the measurement head 200A and the first surface of the reference member and the distance between the measurement head 200B and the second surface of the reference member (after completing of the first step), the user operates the next button 611 in FIG. 10 using the operation unit 620 in FIG. 1. As a result, a guidance screen 694 of FIG. 11 is displayed on the main display unit 610, and the second step is started.

Figure 11:
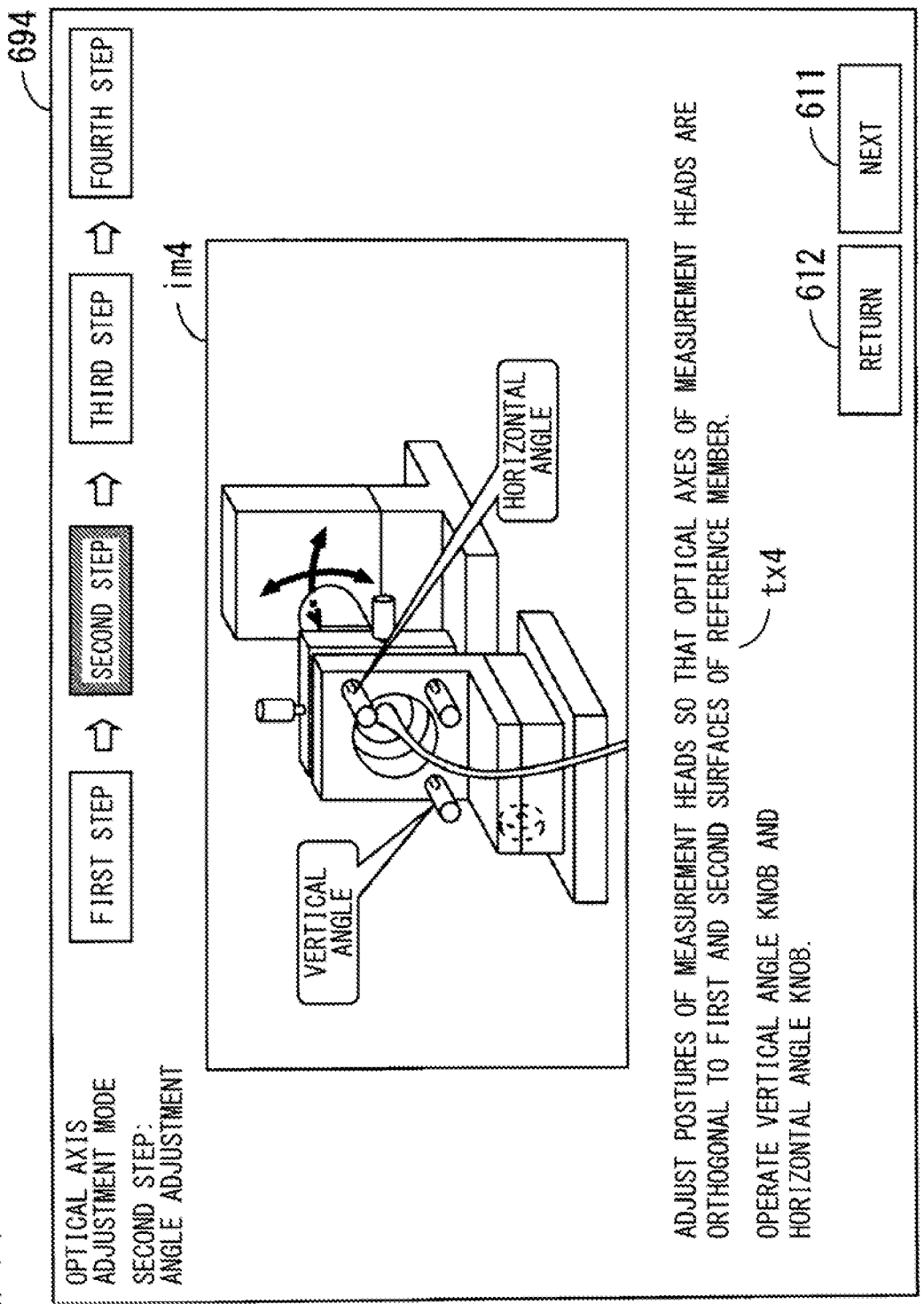
FIG. 11 is a diagram illustrating an example of the guidance screen sequentially displayed on the main display unit of FIG. 1 when adjusting the optical axis of the measurement head.

As shown in FIG. 11, the guidance screen 694 includes a posture adjustment image im4, a fourth message tx4, the next button 611, and the return button 612. The posture adjustment image im4 is displayed at the center of the guidance screen 694, and the fourth message tx4 is displayed below the posture adjustment image im4. The next button 611 and the return button 612 are displayed on the bottom right corner of the guidance screen 694.

The posture adjustment image im4 is an image to make the user adjust the postures of the measurement heads 200A and 200B facing the reference member, and indicates a state where the posture of the measurement head 200A facing the reference member is adjusted. In the posture adjustment image im4 of the present embodiment, the positions of the vertical angle knob 921 (FIG. 7) and the horizontal angle knob 922 (FIG. 7) of the holding device 900 (FIG. 7) to be operated during the adjustment are shown. The fourth message tx4 includes an operation instruction for adjusting the postures of the measurement heads 200A and 200B so that the optical axes oa1 and oa2 of the measurement heads 200A and 200B are orthogonal to the first and second surfaces of the reference member.

The user recognizes the content of the operation to be performed by the user and the operation target of the holding device 900 (FIG. 7) by visually recognizing the posture adjustment image im4 and the fourth message tx4 shown in FIG. 11. Then, the user operates the next button 611 in FIG. 11 using the operation unit 620 in FIG. 1. As a result, a guidance screen 695 of FIG. 12 is displayed on the main display unit 610.

Figure 12:
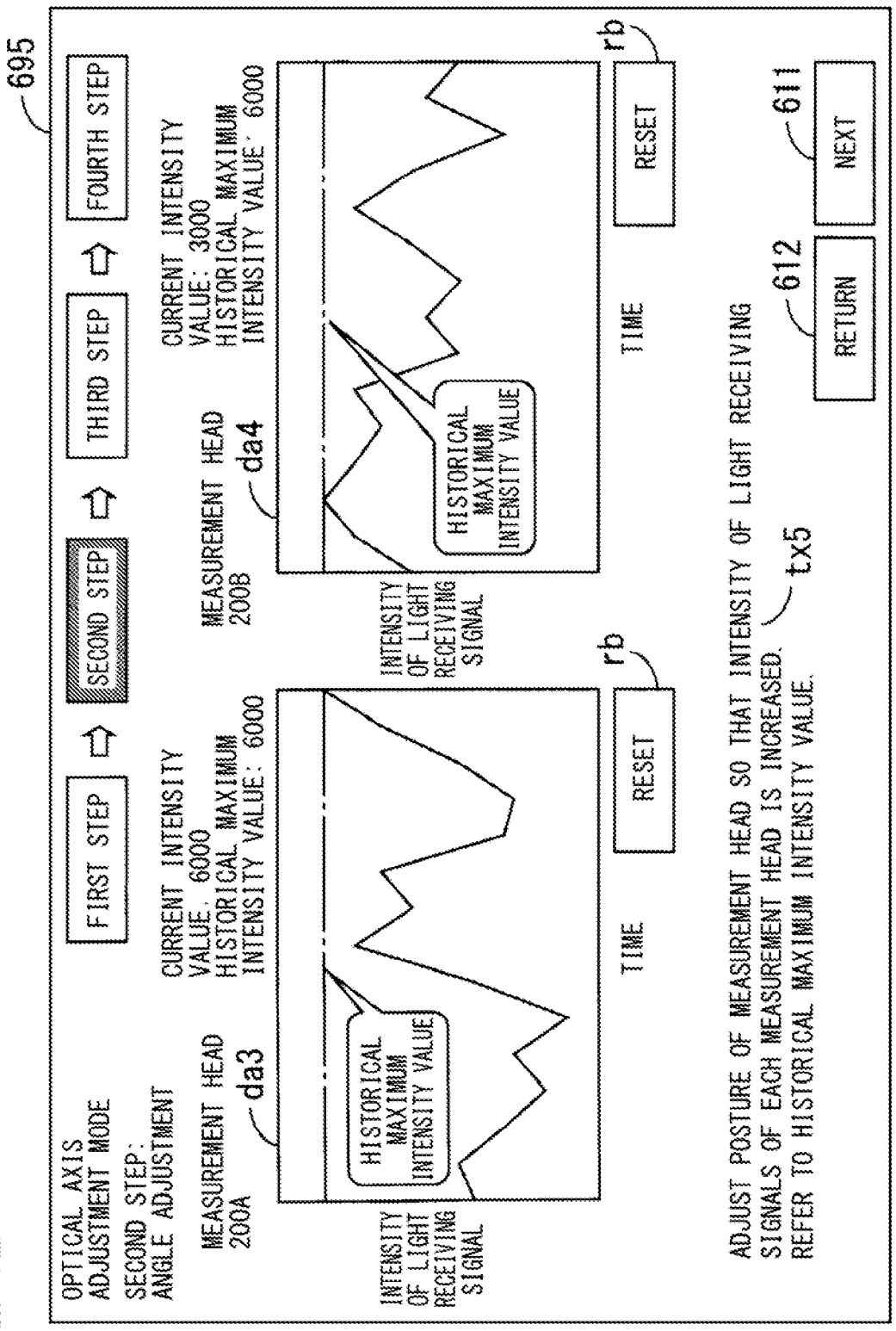
FIG. 12 is a diagram illustrating an example of the guidance screen sequentially displayed on the main display unit of FIG. 1 when adjusting the optical axis of the measurement head.

As shown in FIG. 12, the guidance screen 695 includes change display areas da3 and da4, a fifth message tx5, the next button 611, and the return button 612. The change display area da3 is displayed on the left side of the guidance screen 695 with respect to the center of the guidance screen 695, and the change display area da4 is displayed on the right side of the guidance screen 695 with respect to the center right of the guidance screen 695. The fifth message tx5 is displayed below the change display areas da3 and da4. The next button 611 and the return button 612 are displayed on the bottom right corner of the guidance screen 695.

In the change display area da3, a vertical axis representing the intensity of the light receiving signal and a horizontal axis representing the time (time axis) are displayed, and a temporal change of the intensity of the determination light corresponding to the measurement head 200A by the present point in time is scroll-displayed. Further, in the change display area da3, the historical maximum intensity value indicating the maximum value by the present point in time in the temporal change of the intensity of the determination light acquired through the measurement head 200A is displayed by a dashed-dotted line. Further, at the upper portion of the change display area da3, the intensity value and the historical maximum intensity value of the determination light at the present time corresponding to the measurement head 200A are numerically displayed.

In the change display area da4, as in the case of the change display area da3, the vertical axis representing the intensity of the light receiving signal and the horizontal axis representing the time (time axis) are displayed, and the temporal change of the intensity of the determination light corresponding to the measurement head 200B by the present point in time is scroll-displayed. Further, in the change display area da4, the past maximum intensity value indicating the maximum value by the present point in time in the temporal change of the intensity of the determination light acquired through the measurement head 200B is displayed by a dashed-dotted line. Further, at the upper portion of the change display area da4, the intensity value and the historical maximum intensity value of the determination light at the present time corresponding to the measurement head 200B are numerically displayed.

In the respective change display areas da3 and da4, the display range of the vertical axis corresponding to the intensity of the determination light is automatically adjusted in accordance with the values of the intensity so that the user can easily grasp the temporal change of the intensity of the determination light. A reset button rb is displayed below each change display areas da3 and da4. The reset button rb is used for resetting the display ranges of the vertical axis and the horizontal axis in the change display areas da3 and da4 to preset initial value and resetting the historical maximum intensity value.

The fifth message tx5 includes an operation instruction for adjusting the postures of the measurement heads 200A and 200B so that the intensities of the light receiving signals of the measurement heads 200A and 200B are increased.

The user operates the vertical angle knob 921 (FIG. 7) and the horizontal angle knob 922 (FIG. 7) of the holding device 900 (FIG. 7) while visually recognizing the temporal change of the intensities of the determination light displayed in the change display areas da3 and da4. In this manner, the user adjusts the posture of the measurement head 200A so that the optical axis oa1 of the measurement head 200A is orthogonal to the first surface of the reference member. In addition, the user adjusts the posture of the measurement head 200B so that the optical axis oa2 of the measurement head 200B is orthogonal to the second surface of the reference member. As a result, the optical axes oa1 and oa2 of the measurement heads 200A and 200B become parallel to each other.

In this embodiment, the change display areas da3 and da4 are simultaneously displayed on a single screen of the main display unit 610. Thereby, the user can adjust the postures of the measurement heads 200A and 200B while comparing the intensity of the determination light acquired through the measurement head 200A with the intensity of the determination light acquired through the measurement head 200B.

After the optical axes oa1 and oa2 of the measurement heads 200A and 200B are made orthogonal to the first and second surfaces of the reference member (after completing of the second step), the user operates the next button 611 in FIG. 12 using the operation unit 620 in FIG. 1. As a result, a guidance screen 696 of FIG. 13 is displayed on the main display unit 610, and the third step is started.

Figure 13:
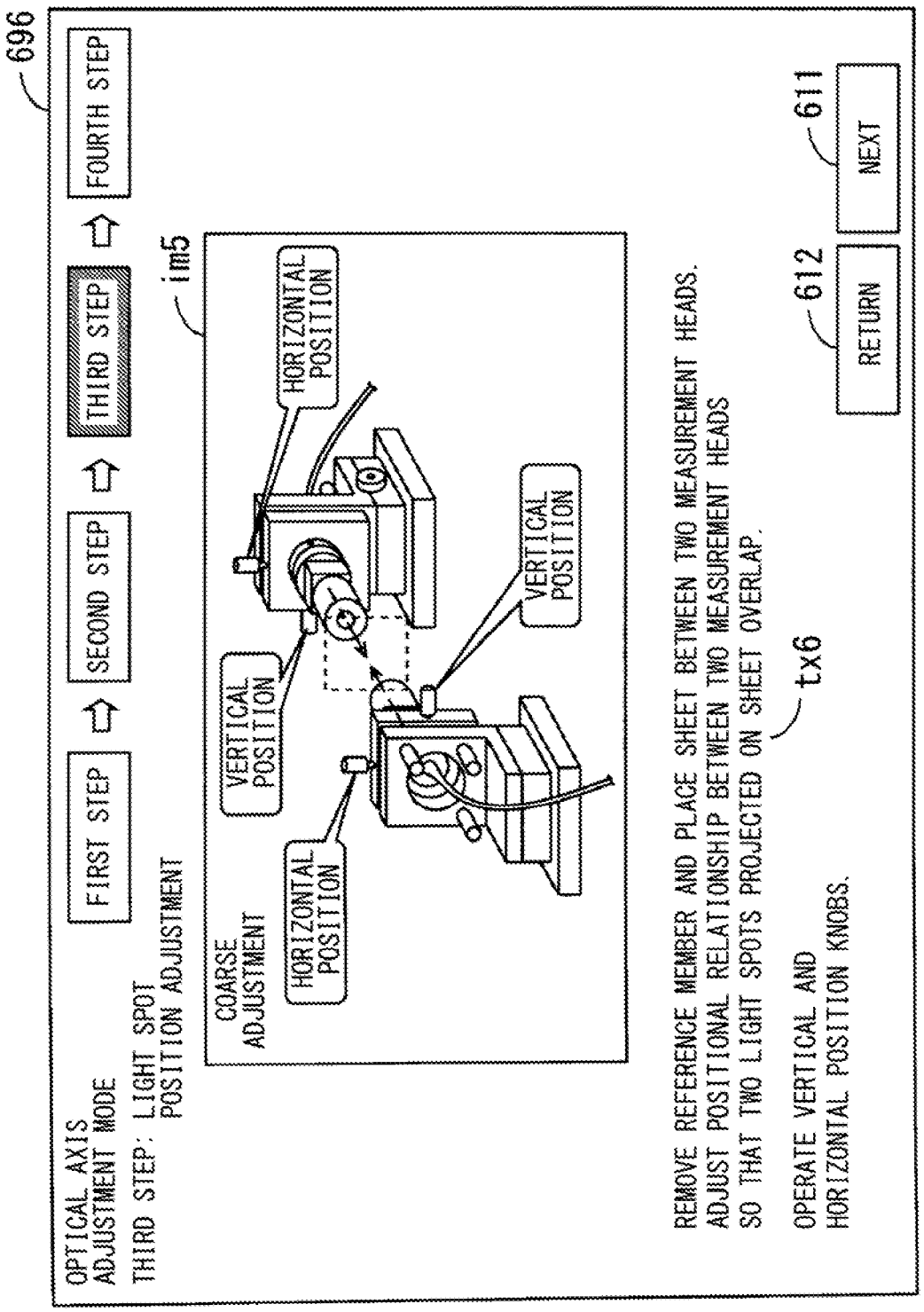
FIG. 13 is a diagram illustrating an example of the guidance screen sequentially displayed on the main display unit of FIG. 1 when adjusting the optical axis of the measurement head.

As shown in FIG. 13, the guidance screen 696 includes an axis adjustment image im5, a sixth message tx6, the next button 611, and the return button 612. The axis adjustment image im5 is displayed at the center of the guidance screen 696, and the sixth messaging tx6 is displayed below the axis adjustment image im5. The next button 611 and the return button 612 are displayed on the bottom right corner of the guidance screen 696.

The axis adjustment image im5 is an image to make the user perform coarse adjustment to make the optical axes oa1 and oa2 of the measurement heads 200A and 200B align with each other, and indicates a state where a sheet is disposed between the measurement heads 200A and 200B instead of a reference member. In the axis adjustment image im5 of the present embodiment, the position of the vertical position knob 931 (FIG. 7) and the horizontal position knob 932 (FIG. 7) of the holding device 900 (FIG. 7) to be operated by the user are shown.

The sixth message tx6 includes an operation instruction for removing the reference member, placing the sheet between the measurement heads 200A, 200B, and adjusting the positional relationship of the measurement heads 200A, 200B so that the two light spots projected on the sheet overlap.

The user recognizes the content of the operation to be performed by the user and the operation target of the holding device 900 (FIG. 7) by visually recognizing the axis adjustment image im5 and the sixth message tx6 shown in FIG. 13. After roughly adjusting the relative positional relationship between the measurement heads 200A and 200B (after completing the third step), the user operates the next button 611 in FIG. 13 using the operation unit 620 in FIG. 1. As a result, a guidance screen 697 of FIG. 14 is displayed on the main display unit 610, and the fourth step is started.

When the fourth step is started, the measurement heads 200A and 200B shift to a state in which light is emitted from any one of the measurement heads 200A and 200B (in this example, the measurement head 200A) and light is not emitted from the other one (in this example, the measurement head 200B). Here, when the optical axes oa1 and oa2 of the measurement heads 200A and 200B align with each other or substantially align with each other, the light emitted from the measurement head 200A enters the measurement head 200B. As a result, the higher the aligning degree of the optical axes oa1 and oa2 of the measurement heads 200A and 200B, the greater the strength of the light receiving signal acquired through the measurement head 200B.

Figure 14:
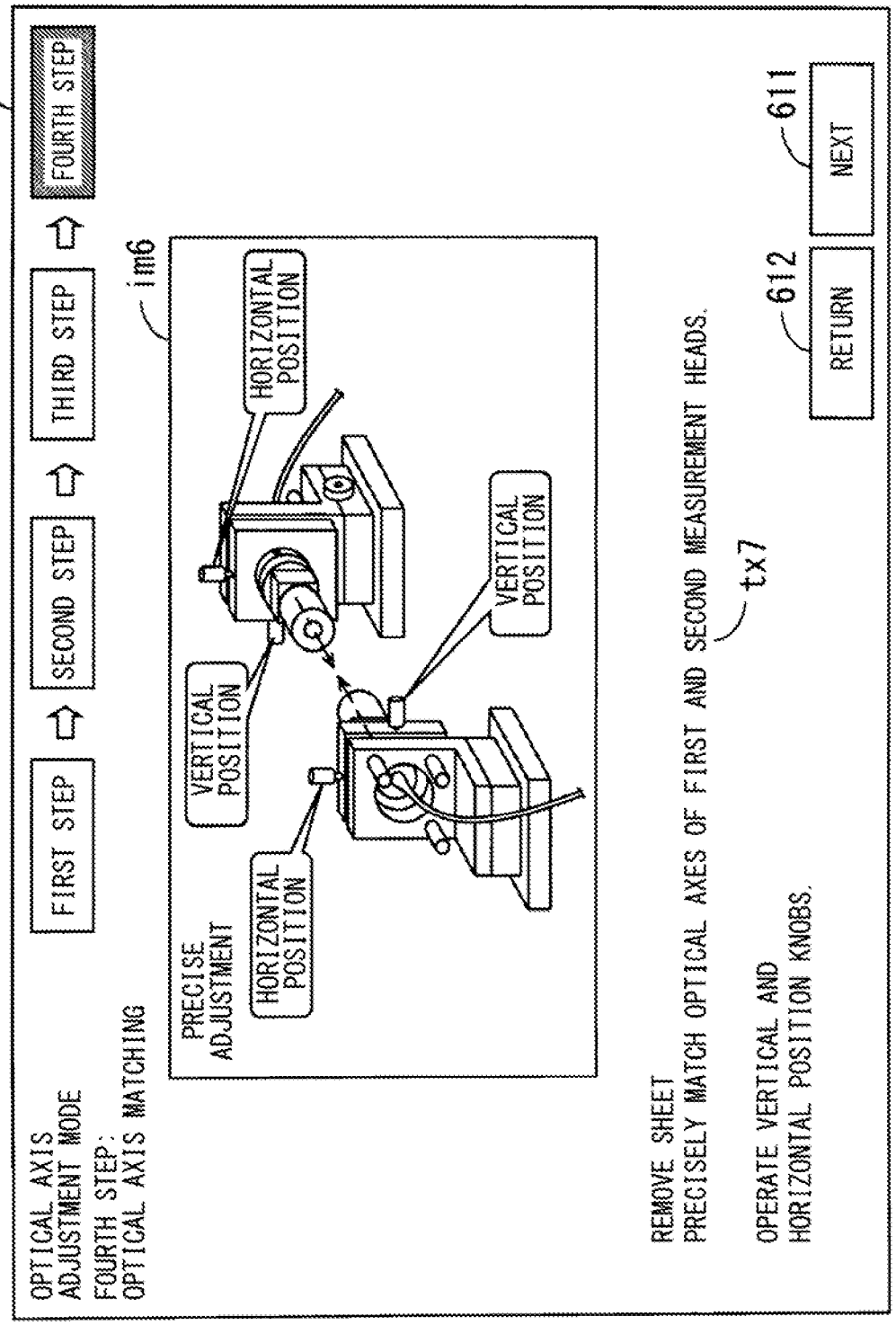
FIG. 14 is a diagram illustrating an example of the guidance screen sequentially displayed on the main display unit of FIG. 1 when adjusting the optical axis of the measurement head.

As shown in FIG. 14, the guidance screen 697 includes an axis adjustment image im6, a seventh message tx7, the next button 611, and the return button 612. The axis adjustment image im6 is displayed at the center of the guidance screen 697, and the seventh messaging tx7 is displayed below the axis adjustment image im6. The next button 611 and the return button 612 are displayed on the bottom right corner of the guidance screen 697.

The axis adjustment image im6 is an image to make the user perform precise adjustment for aligning the optical axes oa1 and oa2 of the measurement heads 200A and 200B, and indicates a case where the measurement heads 200A and 200B are disposed opposite to each other and no other member exists between the measurement heads 200A and 200B. In the axis adjustment image im6 of the present embodiment, the position of the vertical position knob 931 (FIG. 7) and the horizontal position knob 932 (FIG. 7) of the holding device 900 (FIG. 7) to be operated by the user are shown. The seventh message tx7 includes an operation instruction for removing a sheet between the measurement heads 200A and 200B and precisely aligning the optical axes oa1 and oa2 of the measurement heads 200A and 200B.

The user recognizes the content of the operation to be performed by the user and the operation target of the holding device 900 (FIG. 7) by visually recognizing the axis adjustment image im6 and the seventh message tx7 shown in FIG. 14. Then, the user operates the next button 611 in FIG. 14 using the operation unit 620 in FIG. 1. As a result, a guidance screen 698 of FIG. 15 is displayed on the main display unit 610.

Figure 15:
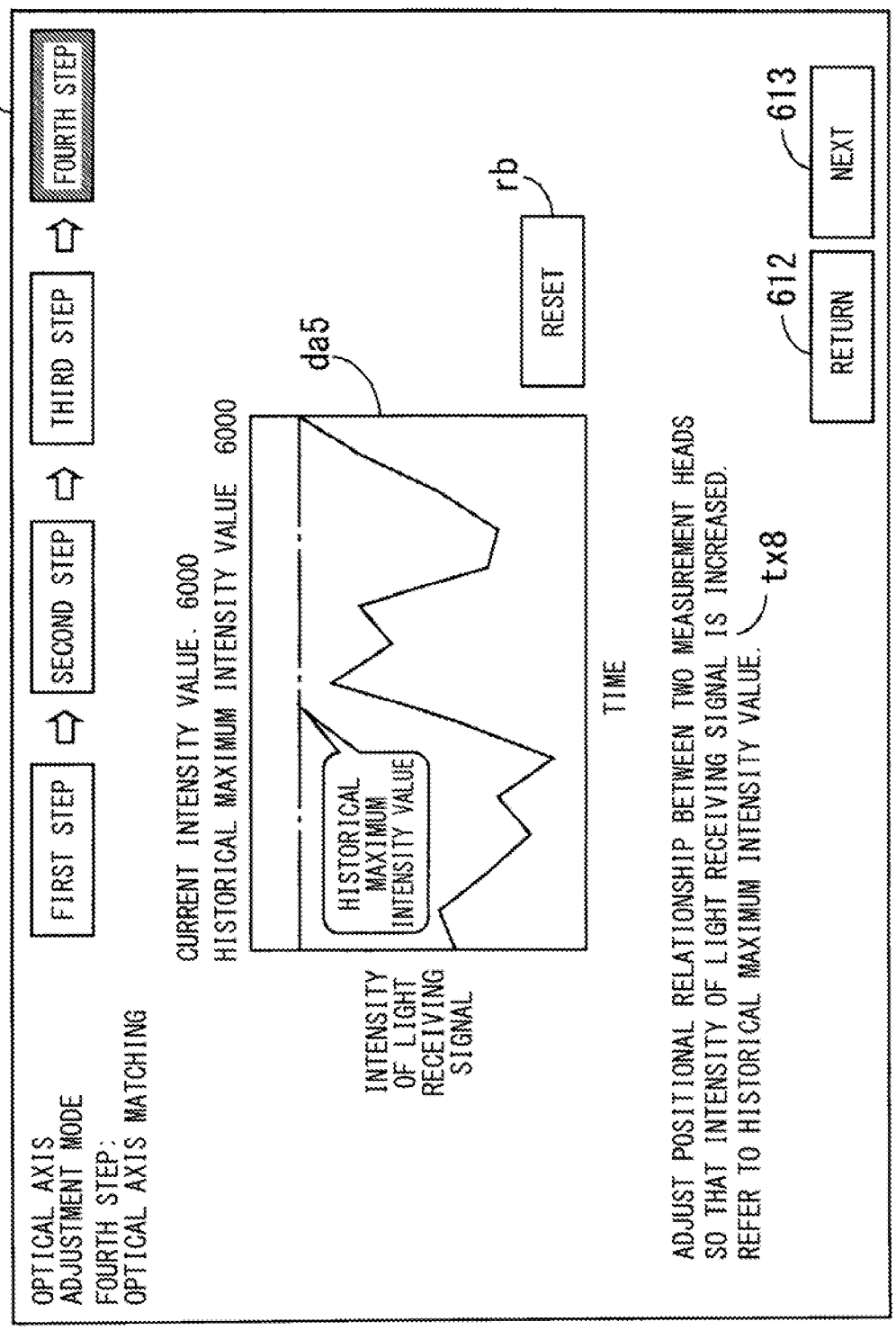
FIG. 15 is a diagram illustrating an example of the guidance screen sequentially displayed on the main display unit of FIG. 1 when adjusting the optical axis of the measurement head.

As shown in FIG. 15, the guidance screen 698 includes a change display area da5, an eighth message tx8, the return button 612, and an end button 613. The change display area da5 is displayed at the center of the guidance screen 698, and the eighth message tx8 is displayed below the change display area da5. The return button 612 and the end button 613 are displayed on the bottom right corner of the guidance screen 698.

In the change display area da5, a vertical axis representing the intensity of the light receiving signal and a horizontal axis representing the time (time axis) are displayed, and a temporal change of the intensity of the light emitted from the measurement head 200A and entered into the measurement head 200B by the present point in time is scroll-displayed. Further, in the change display area da5, the historical maximum intensity value indicating the maximum value by the present point in time in the temporal change of the intensity of the light entering the measurement head 200B is displayed by a dashed-dotted line. Further, the current intensity value and the historical maximum intensity value of the light entering the measurement head 200B are numerically displayed above the change display area da5.

In the change display area da5, the display range of the vertical axis corresponding to the intensity of the light entering the measurement head 200B is automatically adjusted according to the intensity of the light so that the user can easily grasp the temporal change of the intensity of the light. The reset button rb is displayed next to the change display area da5. The reset button rb is used for resetting the display range of the vertical axis and the horizontal axis in the change display area da5 to a preset initial value and resetting the historical maximum intensity value.

The eighth message tx8 includes an operation instruction for adjusting the positional relationship between the measurement heads 200A and 200B so that the intensity of the light receiving signal is increased. The user operates the vertical position knob 931 (FIG. 7) and the horizontal position knob 932 (FIG. 7) of the holding device 900 (FIG. 7) while visually recognizing the temporal change of the intensity of the light displayed in the change display area da5. Thereby, the positional relationship of the measurement heads 200A and 200B is adjusted so that the optical axes oa1 and oa2 of the measurement heads 200A and 200B precisely align with each other.

After precisely aligning the optical axes oa1 and oa2 of the measurement heads 200A and 200B (after completing the fourth step), the user operates the end button 613 of FIG. 15 using the operation unit 620 of FIG. 1. Thereby, the optical axis adjustment of the measurement heads 200A and 200B is completed, and the operation mode of the PC 600 shown in FIG. 1 is switched from the optical axis adjustment mode to the measurement mode.

(5) Functional Configuration and Operation of Confocal Displacement Sensor 500

Figure 16:
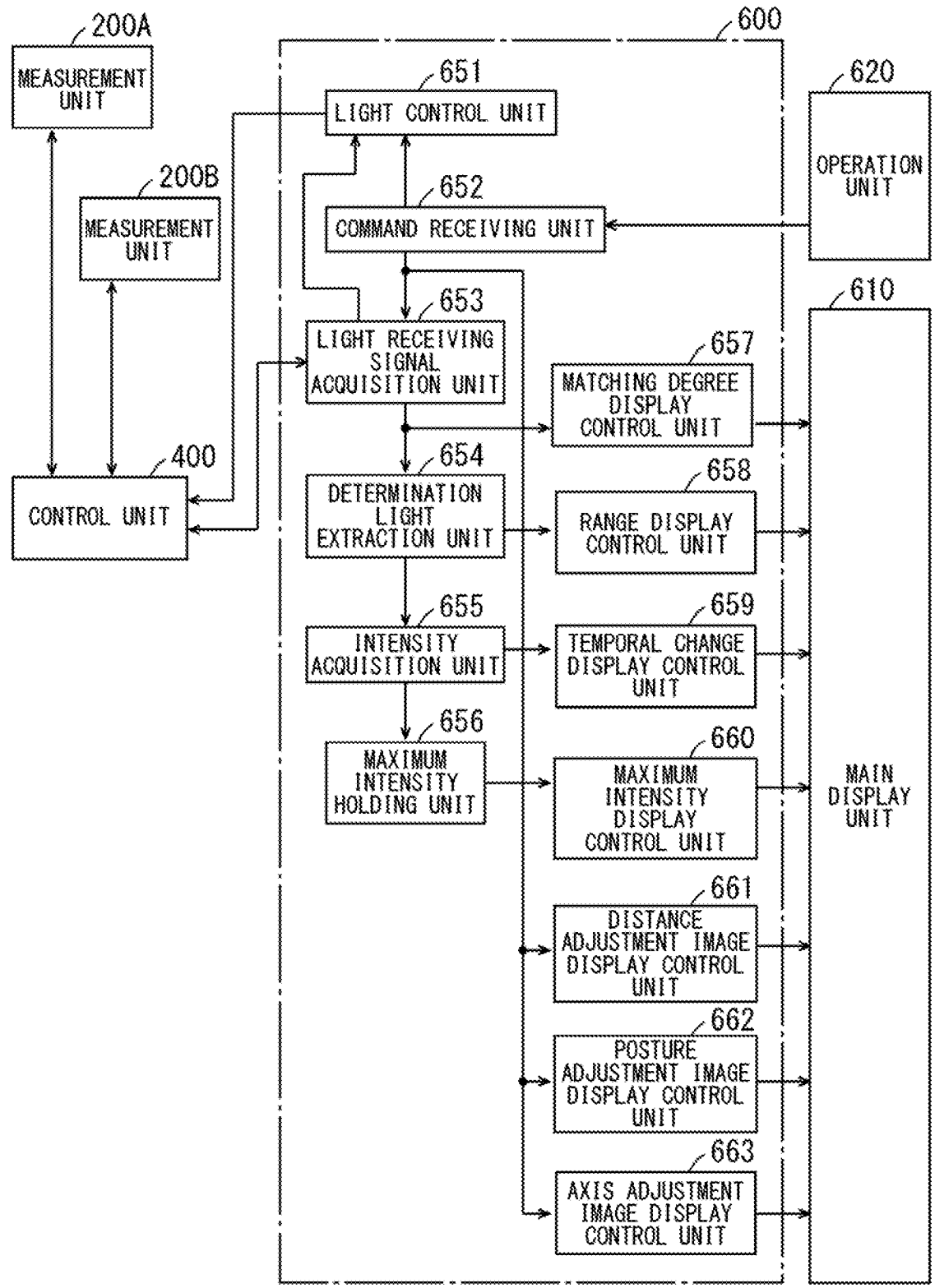
FIG. 16 is a block diagram illustrating a functional configuration of the confocal displacement sensor of FIG. 1.

FIG. 16 is a block diagram showing a functional configuration of the confocal displacement sensor 500 of FIG. 1. As shown in FIG. 16, the PC 600 of FIG. 1 includes a light control unit 651, a command receiving unit 652, a light receiving signal acquisition unit 653, a determination light extraction unit 654, an intensity acquisition unit 655, a maximum intensity holding unit 656, a aligning degree display control unit 657, a range display control unit 658, a temporal change display control unit 659, a maximum intensity display control unit 660, a distance adjustment image display control unit 661, an posture adjustment image display control unit 662, and an axis adjustment image display control unit 663 as functional configurations. The functions of these elements are realized by the CPU 601 of FIG. 1 constituting the PC 600 executing the thickness measurement programs stored in the memory 602. Some or all of the above-mentioned elements maybe configured by hardware such as an electronic circuit. In addition, part or all of the above-mentioned elements may be realized by the control unit 400 by storing part or all of the thickness measurement program in the control unit 400.

The command receiving unit 652 receives a command based on an operation of the operation unit 620 by the user, and provides the received command to the light control unit 651, the light receiving signal acquisition unit 653, the distance adjustment image display control unit 661, the posture adjustment image display control unit 662, and the axis adjustment image display control unit 663.

The light control unit 651 gives a command to the control unit 400 such that each of the measurement heads 200A and 200B emits a light until the adjustment from the first step to the third step of the optical axis adjustment is completed. In this case, the control unit 400 causes the measurement heads 200A and 200B to emit a light, respectively, in response to a command from the light control unit 651.

In addition, the light control unit 651 gives a command to the control unit 400 such that only the measurement head 200A to emit a light in the fourth step of the optical axis adjustment. At this time, the light control unit 651 further receives the light receiving signal output from the measurement unit 100B via a light receiving signal acquisition unit 653, which will be described later. Then, the light control unit 651 commands the control unit 400 to control the amount of a light emitted from the measurement head 200A based on the received light receiving signal. That is, the light control unit 651 controls the operation of the light projecting unit 120 of the measurement unit 100A so that an appropriate amount of the light enters the light receiving unit 140 of the measurement unit 100B.

The light control unit 651 may give a command to the control unit 400 such that only the measurement head 200B emits a light, and may receive a light receiving signal output from the measurement unit 100A. Alternatively, the light control unit 651 may give a command to the control unit 400 to alternately emit a light from the measurement heads 200A and 200B, and may accept the light receiving signal alternately output from the measurement units 100A and 100B. In this case, the light control unit 651 may command the control unit 400 to control the light emitted from one of the measurement heads 200A and 200B based on the received light receiving signal.

The light receiving signal acquisition unit 653 acquires the light receiving signal output from the measurement heads 200A and 200B, and provides the acquired light receiving signal to the light control unit 651, the determination light extraction unit 654, and the aligning degree display control unit 657.

The aligning degree display control unit 657 causes the main display unit 610 to display a temporal change in the intensity of the light receiving signal output from the measurement head 200B in the fourth step of adjusting the optical axis as information indicating the aligning degree of the optical axes oa1 and oa2 of the measurement heads 200A and 200B. In the example of the optical axis adjustment described above, the information shown in the change display area da5 in FIG. 15 corresponds to the information indicating the aligning degree.

The determination light extraction unit 654 extracts a waveform including the determination light from the light receiving signals output from the measurement units 100A and 100B in the first and second steps of the optical axis adjustment, and provides the extracted waveform including the determination light to the intensity acquisition unit 655 and the range display control unit 658.

In the first step of the optical axis adjustment, the range display control unit 658 displays the extracted waveform of the determination light on the wavelength axis. At this time, the range display control unit 658 controls the main display unit 610 so that the position of the waveform of the determination light on the wavelength axis changes in accordance with a change in the distance between the reference member and each of the measurement heads 200A and 200B. In addition, the range display control unit 658 displays the first wavelength range wr1 (FIG. 10) corresponding to a predetermined first range to be adjusted between the measurement head 200A and the first surface of the reference member on the wavelength axis corresponding to the measurement head 200A. Further, the range display control unit 658 displays the second wavelength range wr2 (FIG. 10) corresponding to a predetermined second range to be adjusted between the measurement head 200B and the second surface of the reference member on the wavelength axis corresponding to the measurement head 200B.

In the second step of the optical axis adjustment, the intensity acquisition unit 655 acquires the intensities of the extracted determination lights corresponding to the measurement heads 200A and 200B, respectively, and provides the acquired intensities to the maximum intensity holding unit 656 and the temporal change display control unit 659.

In the second step of the optical axis adjustment, the temporal change display control unit 659 causes the main display unit 610 to display the temporal change in the intensity of the acquired determination light corresponding to the measurement head 200A. In the example of the optical axis adjustment described above, the information shown in the change display area da3 in FIG. 12 corresponds to the temporal change in the intensity of the acquired determination light corresponding to the measurement head 200A. In the second step of the optical axis adjustment, the temporal change display control unit 659 causes the main display unit 610 to display the temporal change in the acquired intensity of the determination light corresponding to the measurement head 200B. In the example of the optical axis adjustment described above, the information shown in the change display area da4 in FIG. 12 corresponds to the temporal change in the intensity of the determination light acquired with respect to the measurement head 200B.

In the second step of the optical axis adjustment, the maximum intensity holding unit 656 updates and holds the maximum intensity by the present point in time in the temporal change of the intensity of the acquired determination light corresponding to the measurement head 200A, and provides the held intensity to the maximum intensity display control unit 660. In the second step of the optical axis adjustment, the maximum intensity holding unit 656 updates and holds the maximum intensity by the present point in time in the temporal change of the intensity of the acquired determination light corresponding to the measurement head 200B, and provides the held intensity to the maximum intensity display control unit 660.

In the second step of the optical axis adjustment, the maximum intensity display control unit 660 causes the main display unit 610 to display the intensity of the determination light corresponding to the measurement head 200A and held by the maximum intensity holding unit 656 as the historical maximum intensity value. In the second step of the optical axis adjustment, the maximum intensity display control unit 660 causes the main display unit 610 to display the intensity of the determination light corresponding to the measurement head 200B and held by the maximum intensity holding unit 656 as the historical maximum intensity value.

In the first step of the optical axis adjustment, the distance adjustment image display control unit 661 causes the main display unit 610 to display the distance adjustment image im2 and a second message tx2 for prompting an operation for adjusting the distance between the measurement head 200A and the first surface of the reference member and the distance between the measurement head 2003 and the second surface of the reference member.

In the second step of the optical axis adjustment, the posture adjustment image display control unit 662 causes the main display unit 610 to display the posture adjustment image im4 and the fourth message tx4 for prompting an operation for adjusting the posture of the measurement heads 200A and 200B so that the optical axes oa1 and oa2 are orthogonal to the first and second surfaces of the reference member.

In the third and fourth steps of the optical axis adjustment, the axis adjustment image display control unit 663 causes the main display unit 610 to display the axis adjustment images im5 and im6, the sixth message tx6, and the seventh message tx7 for prompting operations for aligning the optical axes oa1 and oa2 of the measurement heads 200A and 200B.

(6) Optical Axis Adjustment Measurement Process

Figure 17:
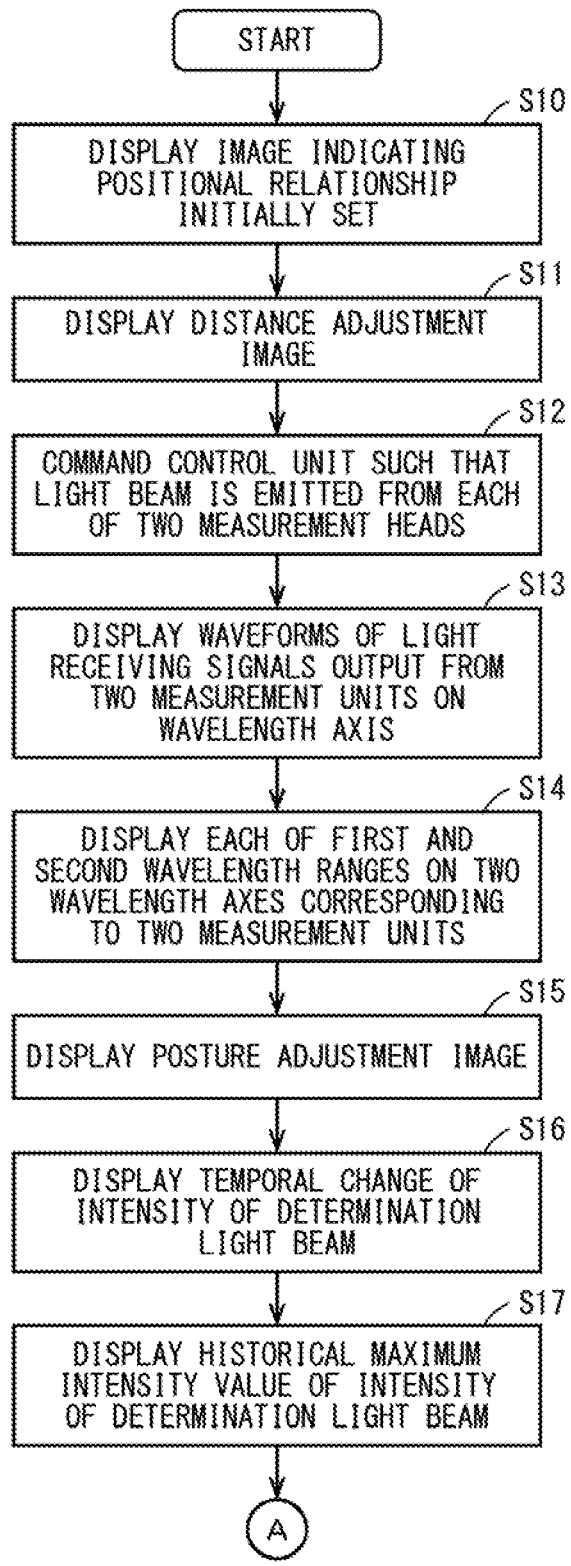
FIG. 17 is a flowchart illustrating an optical axis adjustment processing performed in a PC.
Figure 18:
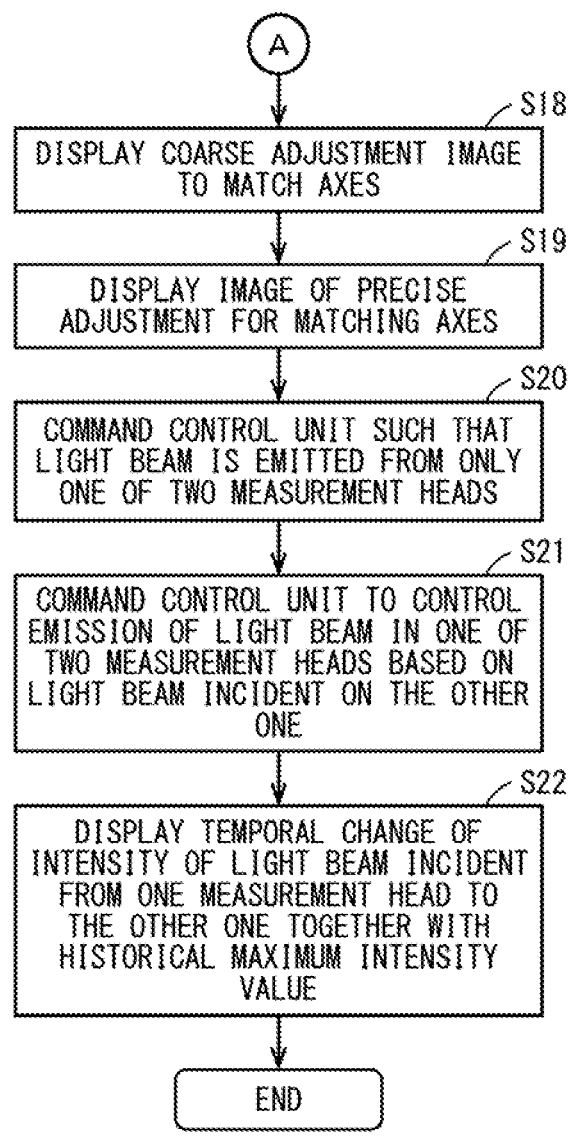
FIG. 18 is a flowchart illustrating the optical axis adjustment processing performed in the PC.

FIGS. 17 and 18 are flowcharts showing the optical axis adjustment process performed in the PC 600. The optical axis adjustment processes of FIGS. 17 and 18 are performed when the CPU 601 of FIG. 1 executes the thickness measurement program stored in the memory 602 and the PC 600 operates in the optical axis adjustment mode in response to the operation of the operation unit 620 of FIG. 1 by the user.

When the optical axis adjustment process is started, the distance adjustment image display control unit 661 causes the main display unit 610 to display the initial-state image im1 indicating the positional relationship between the measurement heads 200A and 200B and the reference member, which is initially set (Step S10).

Next, the distance adjustment image display control unit 661 causes the main display unit 610 to display the distance adjustment image im2 to make the user adjust the distance between the measurement heads 200A and 200B and the reference member in response to the operation of the operation unit 620 by the user (Step S11).

Next, the light control unit 651 commands the control unit 400 such that the two measurement heads 200A and 200B emit a light (step S12). As a result, a light is emitted from each of the measurement heads 200A and 200B under the control of the control unit 400.

Next, the range display control unit 658 causes the main display unit 610 to display the waveforms of the light receiving signals of the light emitted from the measurement heads 200A and 200B together with the wavelength axis in response to the operation of the operation unit 620 by the user (Step S13). The range display control unit 658 displays the first and second wavelength areas wr1 and wr2 in which the positions of the determination light align with each other on the two wavelength axes corresponding to the measurement heads 200A and 200B (Step S14).

Next, the posture adjustment image display control unit 662 causes the main display unit 610 to display posture adjustment image im4 to make the user adjust the postures of the measurement heads 200A and 200B facing the reference member in response to the operation of the operation unit 620 by the user (Step S15).

Next, the temporal change display control unit 659 causes the main display unit 610 to display temporal changes in the intensities of the determination light corresponding to each of the measurement heads 200A and 200B in response to the operation of the operation unit 620 by the user (Step S16). The maximum intensity display control unit 660 causes the main display unit 610 to display the historical maximum intensity values of the intensities of the determination light acquired through the measurement heads 200A and 200B (Step S17).

Next, the axis adjustment image display control unit 663 causes the main display unit 610 to display an axis adjustment image im5 to make the user perform coarse adjustment for aligning the optical axes oa1 and oa2 of the measurement heads 200A and 200B in response to the operation of the operation unit 620 by the user (Step S18).

Next, the axis adjustment image display control unit 663 causes the main display unit 610 to display an axis adjustment image im6 to make the user perform precise adjustment for aligning the optical axes oa1 and oa2 of the measurement heads 200A and 200B in response to the operation of the operation unit 620 by the user (Step S19).

At this time, the light control unit 651 commands the control unit 400 such that only one of the measurement heads 200A and 200B emits a light (Step S20). As a result, a light is emitted from only one of the measurement heads 200A and 200B under the control of the control unit 400.

The light control unit 651 commands the control unit 400 to control the emission of a light from one of the measurement heads 200A and 200B based on the light receiving signal of the light incident on the other one of the measurement heads 200A and 200B (Step S21).

Thereafter, the aligning degree display control unit 657 causes the main display unit 610 to display the temporal change in the intensity of the light entering from one of the measurement heads 200A and 200B to the other one as information indicating the aligning degree in the optical axes oa1 and oa2 together with the historical maximum intensity value (Step S22).

Finally, the command receiving unit 652 terminates the optical axis adjustment processing in response to the operation of the operation unit 620 by the user.

(7) Effect

In the confocal displacement sensor 500 described above, in the second step when adjusting the optical axes of the measurement heads 200A and 200B, in a state where the reference member is disposed between the measurement heads 200A and 200B, the temporal changes in the intensities of the determination light acquired by the measurement heads 200A and 200B are displayed on the main display unit 610 together with the historical maximum intensity value. The intensities of the respective determination light increase as the degrees of orthogonality of the optical axes oa1 and oa2 of the measurement heads 200A and 200B with respect to the first or second surface of the reference member increase. Further, the intensities of the respective determination light become lower as the degrees of orthogonality of the optical axis oa1 and oa2 of the measurement heads 200A and 200B with respect to the first or second surface are lower. Therefore, the user can easily and accurately adjust the postures of the measurement heads 200A and 200B so that the optical axes oa1 and oa2 of the measurement heads 200A and 200B are orthogonal to the first and second surfaces of the reference member while visually recognizing the temporal changes in the intensities of the respective determination light.

Thereafter, the user can accurately align the optical axes oa1 and oa2 of the measurement heads 200A and 200B by adjusting the relative positional relationship of the measurement heads 200A and 200B. As a result, the thickness of the measurement object S is measured with high accuracy by operating the PC 600 in the measurement mode after adjusting the optical axes of the measurement heads 200A and 200B.

In the optical axis adjustment of the measurement heads 200A and 200B, a plurality of guidance screens 696 to 698 indicating the contents of the operation to be performed by the user are displayed on the main display unit 610 in a predetermined order in response to the operation of the operation unit 620 by the user. Therefore, the user can perform the optical axis adjustment in an appropriate order.

Second Embodiment

Figure 19:
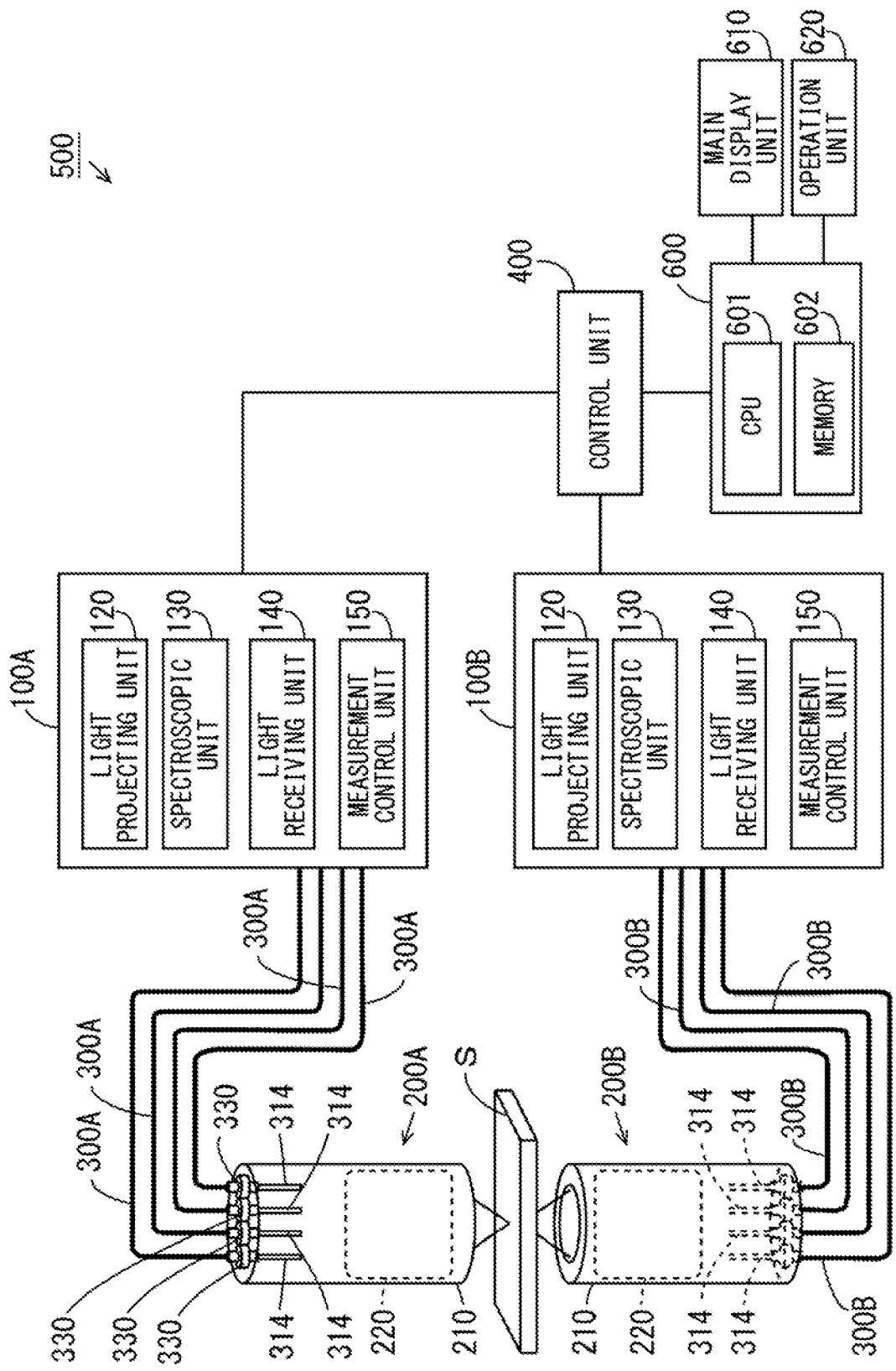
FIG. 19 is a schematic diagram illustrating a configuration of a confocal displacement sensor according to a second embodiment.

A confocal displacement sensor according to the second embodiment will be described regarding points different from the confocal displacement sensor 500 according to the first embodiment. FIG. 19 is a schematic diagram illustrating a configuration of the confocal displacement sensor according to the second embodiment. As shown in FIG. 19, four optical fibers 314 are provided in the measurement unit 100A according to the present embodiment. The four optical fibers 314 of the present embodiment are disposed so as to be located at four corners of a square centered on the optical axis oa1 in a surface orthogonal to the optical axis oa1 of the lens unit 220 and so as to be close to each other.

Four light guiding units 300A corresponding to the four optical fibers 314 are provided between the measurement head 200A and the measurement unit 100A. In such a configuration, the light projecting unit 120 of the measurement unit 100A inputs a light to the optical fibers 311 (FIG. 1) of the four light guiding units 300A. In this case, the light input to the optical fiber 311 of each light guiding unit 300A passes through the corresponding optical fiber 314 and lens unit 220 in the measurement unit 100A, and is emitted to the surface of the measurement object S.

The traveling directions of the four light emitted from the measurement head 200A to the measurement object S through the four optical fibers 314 are parallel to the optical axis oa1 of the measurement head 200A. Therefore, when the optical axis oa1 of the measurement head 200A is orthogonal to the surface of the measurement object S, the four light emitting positions on the surface of the measurement object S are located at four corners of a square centered on the optical axis oa1.

The light emitted to the measurement object S from each optical fiber 314 and reflected by the surface of the measurement object S is input to the optical fiber 314. The light input to the optical fiber 314 is guided to the spectroscopic unit 130 through the optical fiber 312 (FIG. 1) of the light guiding unit 300A corresponding to the optical fiber 314.

In the present embodiment, the light receiving unit 140 of the spectroscopic unit 130 includes an imaging element (two-dimensional line sensor) in which a plurality of pixels are arranged in a two-dimensional manner. The light receiving unit 140 has four light receiving areas having a rectangular shape corresponding to the four optical fibers 314 of the measurement head 200A. Each light receiving area functions as a one-dimensional line sensor.

The four lights guided from the four optical fibers 314 to the spectroscopic unit 130 are respectively separated in the spectroscopic unit 130, and focused on different positions in one dimension for each wavelength in the four light receiving areas. From each pixel in each light receiving area, a light receiving signal corresponding to the amount of received light is output to the measurement control unit 150. In this case, the measurement control unit 150 acquires the waveforms of the four light receiving signals corresponding to the four light receiving areas, and performs averaging processing on the acquired four waveforms. The averaging process in this example means a process of generating an average distribution signal corresponding to the average of the intensities of the four light that have passed through the four optical fibers 314 (pinholes) for each wavelength. The averaging process is, for example, an integration process. In addition, the measurement control unit 150 calculates the displacement of the surface of the measurement object S based on the waveform of the received light receiving signal acquired by the averaging process.

The measurement unit 100A and the measurement unit 100B have the same configuration, the measurement head 200A and the measurement head 200B have the same configuration, and the four light guiding unit 300A and the four light guiding unit 300B have the same configuration. Therefore, the measurement control unit 150 of the measurement unit 100B calculates the displacement of the surface of the measurement object S based on the waveforms of the light receiving signals of the four light emitted from the measurement head 200B to the measurement object S and reflected.

When the CPU 601 executes the thickness measurement program stored in the memory 602, the PC 600 operates in the measurement mode and the optical axis adjustment mode. In the measurement mode, the thickness of the measurement object S disposed between the measurement units 100A and 100B is measured. In the optical axis adjustment mode, the optical axes of the measurement heads 200A and 200B facing each other are adjusted before the measurement of the thickness of the measurement object S in the measurement mode.

In each of the measurement units 100A and 200B according to the present embodiment, waveforms of four light receiving signals are acquired. Therefore, in the optical axis adjustment according to the present embodiment, only one of the four light receiving signals is used in the first step. That is, in the first step, the waveform and intensity of one of the four light receiving signals acquired by each of the measurement heads 200A and 200B (hereinafter, referred to as representative light) are displayed on the main display unit 610 (see FIG. 10). Thereby, the user can easily and accurately adjust the distance between the measurement heads 200A and 200B while visually recognizing the waveform and intensity of the light receiving signal of the representative light.

In the second step, determination light are extracted from the four light acquired by the measurement heads 200A and 200B, respectively. For each of the measurement heads 200A and 200B, the determination light having the maximum intensity among the four determination light is extracted as the maximum determination light. Further, the determination light having the minimum intensity among the four determination light is extracted as the minimum determination light.

For the respective measurement heads 200A and 200B, a difference absolute value between the intensity of the maximum determination light and the intensity of the minimum determination light decreases as the degree of orthogonality of the optical axes oa1 and oa2 of the measurement heads 200A and 200B with respect to the first and second surfaces of the reference member increases. On the other hand, the difference absolute value between the intensity of the maximum determination light and the intensity of the minimum determination light increases as the degree of orthogonality of the optical axes oa1 and oa2 of the measurement heads 200A and 200B with respect to the first and second surfaces of the reference member decreases.

Therefore, in the present embodiment, the reciprocal of the difference absolute value between the intensity of the maximum determination light and the intensity of the minimum determination light is used as the orthogonality evaluation value indicating the orthogonality of the optical axes oa1 and oa2 of the measurement heads 200A and 200B with respect to the first and second surfaces of the reference member. In this case, the larger the degree of orthogonality evaluation value is, the higher the degree of orthogonality of the optical axes oa1 and oa2 of the measurement heads 200A and 200B with respect to the first and second surface of the reference member is. On the other hand, the smaller the orthogonality evaluation value is, the lower the orthogonality of the optical axes oa1 and oa2 of the measurement heads 200A and 200B with respect to the first and second surface of the reference member is.

Therefore, in the optical axis adjustment according to the second embodiment, in the second step, temporal changes of the orthogonality estimation values corresponding to the measurement heads 200A and 200B are displayed in the change display areas da3 and da4 of FIG. 12. Thus, the user can easily and accurately adjust the postures of the measurement heads 200A and 200B while visually recognizing the temporal change in the orthogonality evaluation value.

As the orthogonality evaluation value, a simple difference absolute value between the intensity of the maximum determination light and the intensity of the minimum determination light may be used. In this case, the smaller the orthogonality evaluation value is, the higher the orthogonality of the optical axes oa1 and oa2 of the measurement heads 200A and 200B with respect to the first and second surfaces of the reference member is. Further, the larger the orthogonality evaluation value is, the lower the orthogonality of the measurement heads 200A and 200B in the optical axes oa1 and oa2 with respect to the first or second surface of the reference member is.

In the second step, the temporal changes in the intensities of all the four determination light corresponding to the measurement heads 200A and 200B may be displayed in the change display areas da3 and da4 of FIG. 12 instead of the orthogonality evaluation values. In this case, the user can increase the degree of orthogonality of the optical axes oa1 and oa2 of the measurement heads 200A and 200B with respect to the first and second surfaces by adjusting the postures of the measurement heads 200A and 200B so that the intensities of the four determination light align with each other.

Here, as described above, the traveling directions of the four light emitted from the measurement head 200A to the measurement object S through the four optical fibers 314 are parallel to the optical axis oa1 of the measurement head 200A, but do not align with the optical axis oa1 of the measurement head 200A. Therefore, when the four optical fibers 314 of the measurement head 200A do not face the four optical fibers 314 of the measurement head 200B, the optical axes oa1 and oa2 do not align with each other.

Therefore, in the optical axis adjustment of the measurement heads 200A and 200B according to the present embodiment, the guidance screen displayed on the main display unit 610 in the fourth step includes an operation command for adjusting the rotational angles of the measurement heads 200A and 200B around the optical axes oa1 and oa2. In the fourth step, on the guidance screen displayed on the main display unit 610, the temporal changes of the intensities of the four light emitted from the measurement head 200A and incident on the measurement head 200B by the present point in time are scroll-displayed.

Figure 20:
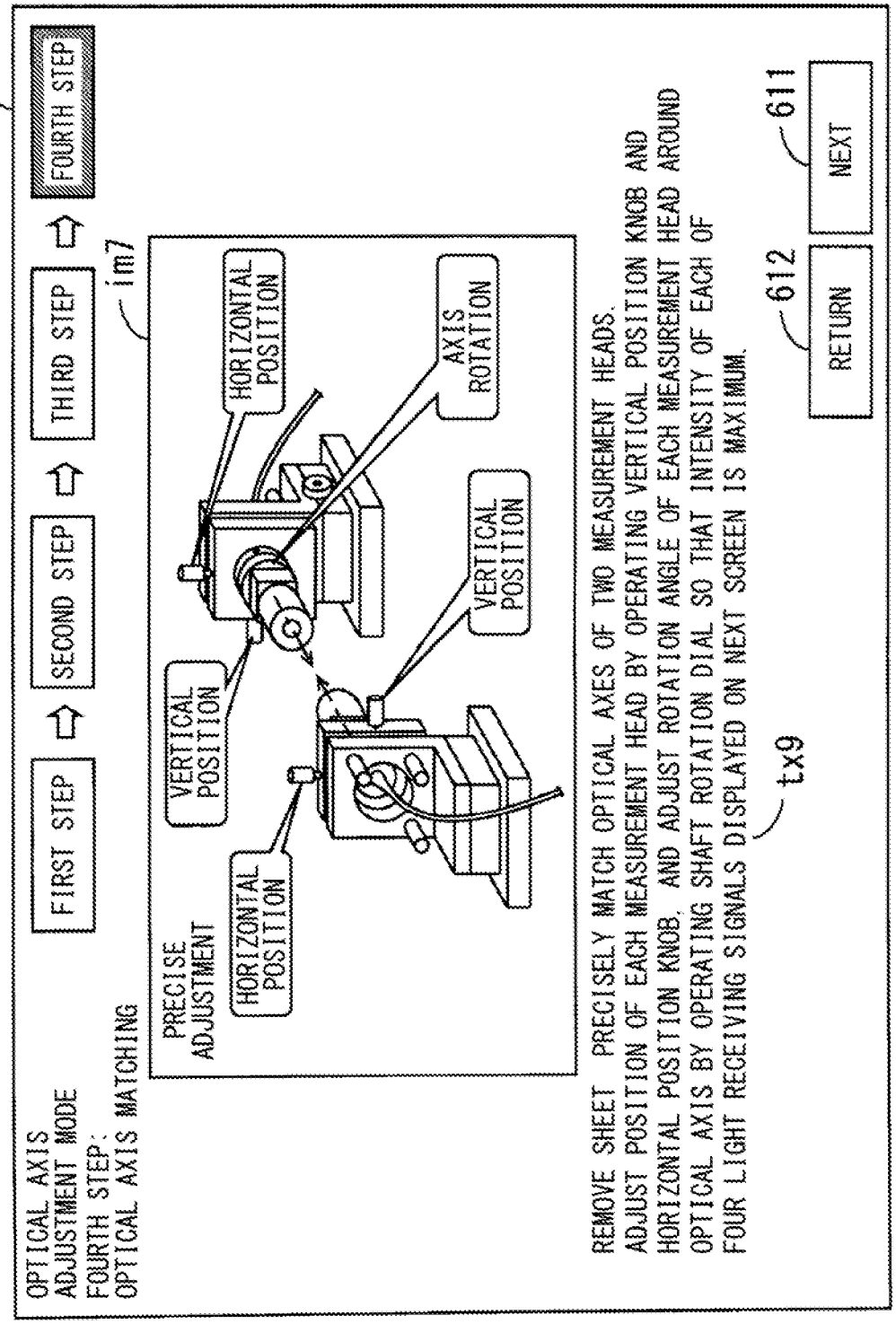
FIG. 20 is a diagram illustrating an example of a guidance screen displayed on a main display unit in a fourth step in the optical axis adjustment according to the second embodiment.
Figure 21:
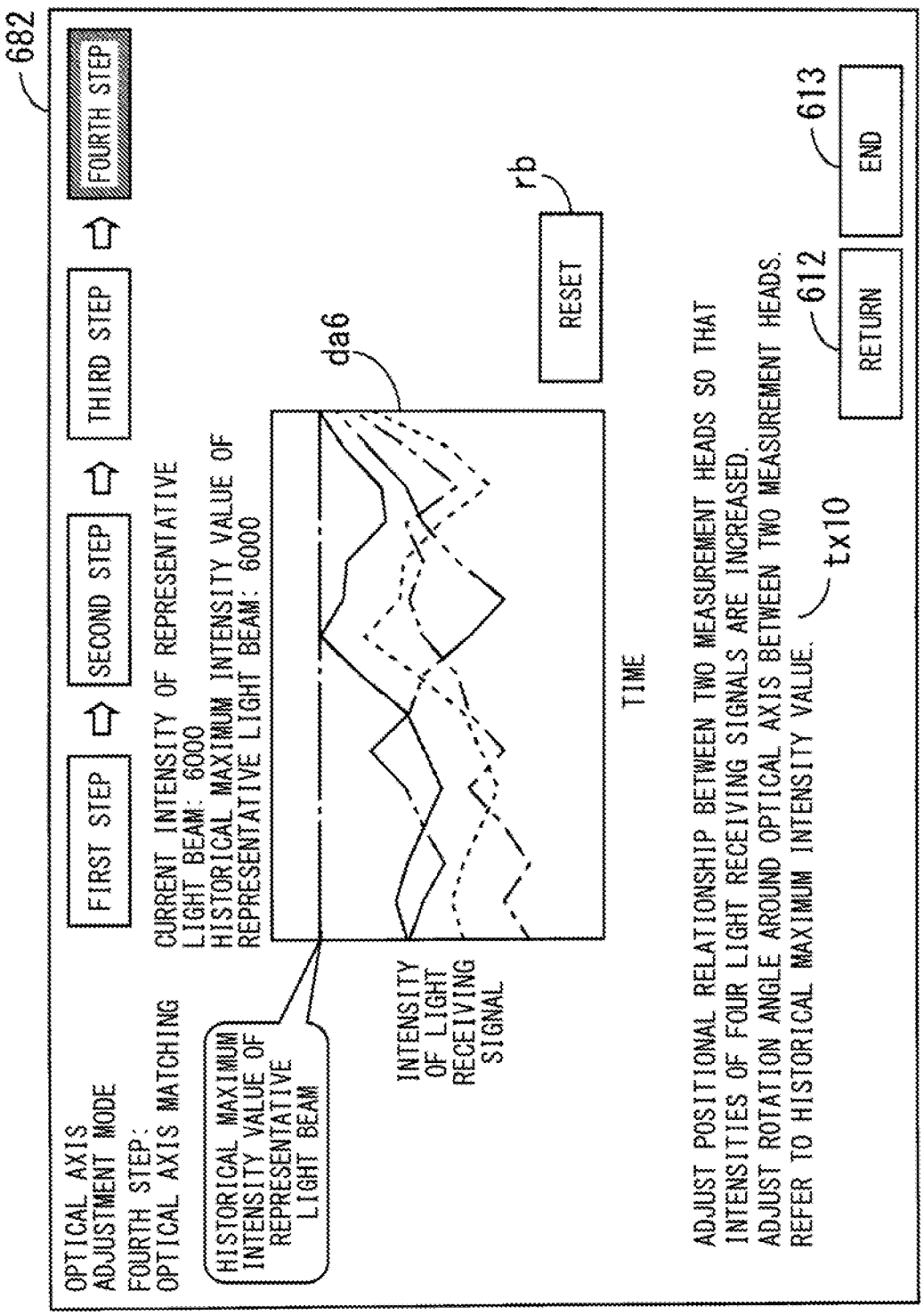
FIG. 21 is a diagram illustrating an example of the guidance screen displayed on the main display unit in the fourth step in the optical axis adjustment according to the second embodiment.

FIGS. 20 and 21 are diagrams illustrating an example of a guidance screen displayed on a main display unit 610 in a fourth step in the optical axis adjustment according to a second embodiment. As shown in FIG. 20, in the present embodiment, a guidance screen 681 displayed on the main display unit 610 when the fourth step of optical axis adjustment is started includes an axis adjustment image im7, a ninth message tx9, the next button 611, and the return button 612. The axis adjustment image im7 is displayed at the center of the guidance screen 681, and the ninth messaging tx9 is displayed below the axis adjustment image im7. The next button 611 and the return button 612 are displayed on the bottom right corner of the guidance screen 681.

The axis adjustment image im7 is an image to make the user perform precise adjustment for aligning the optical axes oa1 and oa2 of the measurement heads 200A and 200B, similarly to the first embodiment, and indicates a case where the measurement heads 200A and 200B are disposed opposite to each other and no other member exists between the measurement heads 200A and 200B. In the axis adjustment image im7 of the present embodiment, the position of the vertical position knob 931 (FIG. 7), the horizontal position knob 932 (FIG. 7), and the shaft rotation dial 941 (FIG. 7) of the holding device 900 (FIG. 7) to be operated by the user are shown. The ninth message tx9 includes an operation instruction for removing a sheet between the measurement heads 200A and 200B and precisely aligning the optical axes oa1 and oa2 of the measurement heads 200A and 200B.

The ninth message tx9 includes an operation instruction for adjusting the positions of the measurement heads 200A and 200B by operating the vertical position knob 931 and the horizontal position knob 932 in order to precisely align the optical axes oa1 and oa2. Further, the ninth message tx9 includes an operation instruction for adjusting the rotation angles of the measurement heads 200A and 200B around the optical axes oa1 and oa2 by operating the shaft rotation dial 941.

The user recognizes the content of the operation to be performed by the user and the operation target of the holding device 900 (FIG. 7) by visually recognizing the axis adjustment image im7 and the ninth message tx9 shown in FIG. 20. Then, the user operates the next button 611 using the operation unit 620 shown in FIG. 1. As a result, a guidance screen 682 of FIG. 21 is displayed on the main display unit 610.

As shown in FIG. 21, the guidance screen 682 includes a change display area da6, a tenth message tx10, the return button 612, and the end button 613. The change display area da6 is displayed at the center of the guidance screen 682, and the tenth message tx10 is displayed below the change display area da6. The return button 612 and the end button 613 are displayed on the bottom right corner of the guidance screen 682.

In the present embodiment, in the change display area da5, the temporal changes of the intensities of the four light emitted from the measurement head 200A and entered into the measurement head 200B for a predetermined time by the present point in time are scroll-displayed so as to be distinguishable from each other.

When the four optical fibers 314 of the measurement head 200A and the four optical fibers 314 of the measurement head 200B face each other, most of the light emitted from the four optical fibers 314 of the measurement head 200A is accurately incident on the four optical fibers 314 of the measurement head 200B. Therefore, the intensities of the four light are maximized. Therefore, the user operates the vertical position knob 931 (FIG. 7), the horizontal position knob 932 (FIG. 7), and the shaft rotation dial 941 (FIG. 7) of the holding device 900 (FIG. 7) while visually recognizing the temporal changes of the intensities of the four light displayed in the change display area da6. As a result, the user adjusts the positional relationship and rotational angles of the measurement heads 200A and 200B so that the optical axes oa1 and oa2 of the measurement heads 200A and 200B precisely align with each other.

In the change display area da6 of the present embodiment, the historical maximum intensity value indicating the maximum value by the present point in time in the temporal changes of the intensities of a representative light among the four light entering the measurement head 200B is displayed by a dashed-dotted line. Further, the current intensity value and the historical maximum intensity value of the representative light entering the measurement head 200B are numerically displayed above the change display area da6. The reset button rb is displayed next to the change display area da6.

The reset button rb is used for resetting the display range of the vertical axis and the horizontal axis in the change display area da6 to preset initial value and resetting the historical maximum intensity value.

The tenth message tx10 includes an operation instruction for adjusting the positions of the measurement heads 200A and 200B and an operation instruction for adjusting the rotational angles of the measurement heads 200A and 200B, similarly to the ninth message tx9.

After precisely aligning the optical axes oa1 and oa2 of the measurement heads 200A and 200B (after completing the fourth step), the user operates the end button 613 using the operation unit 620 shown in FIG. 1. Thereby, the optical axis adjustment of the measurement heads 200A and 200B is completed, and the operation mode of the PC 600 shown in FIG. 1 is switched from the optical axis adjustment mode to the measurement mode.

In the confocal displacement sensor 500 according to the present embodiment, as in the first embodiment, the optical axes oa1 and oa2 of the measurement heads 200A and 200B can easily and accurately align with each other by the optical axis adjustment.

In the measurement units 100A and 100B according to the present embodiment, four light receiving signals are acquired based on the four light emitted to the measurement object S from the measurement heads 200A and 200B. The displacement of the surface of the measurement object S is calculated based on the light receiving signals acquired by the averaging process of the four light receiving signals. In this case, the intensities of the plurality of light that have passed through the plurality of pinholes in the averaged light receiving signals are averaged for each wavelength. As a result, a component of a light that generates a random measurement error due to diffuse reflection is canceled out. Therefore, the error of the displacement of the surface of the measurement object S measured in each of the measurement units 100A and 100B is reduced. As a result, the measurement error of the thickness of the measurement object S is reduced.

Other Embodiments (1) In the above embodiment, when the range of the distance between the measurement head 200A and the first surface of the reference member is in the first distance range, the range of the peak wavelength of the determination light is displayed on the main display unit 610 as the first wavelength range wr1 in the second step of optical axis adjustment, but the present invention is not limited thereto.

In the second step, when the range of the distance between the measurement head 200A and the first surface of the reference member is in the first distance range, the range of the peak wavelength of the primary light focused and reflected by the first surface may be displayed on the main display unit 610 as the first wavelength range. In this case, the user adjusts the distance between the measurement head 200A and the first surface of the reference member so that the peak waveform of the primary light is located within the first wavelength range. Thereby, the range of the distance between the measurement head 200A and the first surface of the reference member is adjusted to the first distance range.

In the above embodiment, when the range of the distance between the measurement head 200B and the second surface of the reference member is in the second distance range, the range of the peak wavelength of the determination light is displayed on the main display unit 610 as the second wavelength range wr2 in the second step of optical axis adjustment, but the present invention is not limited thereto.

In the second step, when the range of the distance between the measurement head 200B and the second surface of the reference member is in the second distance range, the range of the peak wavelength of the primary light focused and reflected by the second surface may be displayed on the main display unit 610 as the second wavelength range. In this case, the user adjusts the distance between the measurement head 200B and the second surface of the reference member so that the peak waveform of the primary light is located within the second wavelength range. Thereby, the range of the distance between the measurement head 200B and the second surface of the reference member is adjusted to the second distance range.

(2) As shown in the first and second embodiments, a type of emitting only one light for displacement measurement and a type of emitting a plurality of light for displacement measurement are used as the measurement heads 200A and 200B. Therefore, types of the measurement units 100A and 100B correspond to the types of the connected measurement heads 200A and 200B.

The control unit 400 may be configured to be able to identify the type of measurement unit connected to the control unit 400. In this case, in the CPU 601 of the PC 600, when the types of the two measurement units 100A and 100B identified by the control unit 400 are different from each other, a message indicating that the thickness measurement and the optical axis adjustment cannot be performed may be displayed on the main display unit 610.

(3) In the confocal displacement sensor 500 according to the second embodiment, the displacement of the surface of the measurement object S is measured on the basis of the light receiving signals of the four light by emitting the four light from the measurement heads 200A and 200B to the measurement object S, but the present invention is not limited thereto. Each of the measurement heads 200A and 200B may emit the measurement object S with two light, three light, or a plurality of five or more light. In this case, the displacement of the surface of the measurement object S may be measured based on the number of light receiving signals which corresponds to the number of emitted light.

(4) In the above embodiment, an example in which the postures of the measurement heads 200A and 200B arranged to face each other are adjusted in order to acquire the thickness of the measurement object S has been described, but the present invention is not limited thereto.

For example, when measuring the displacement of the surface of the measurement object S using one of the measurement heads 200A and 200B, it is desirable that the optical axis of the measurement head is orthogonal to the surface of the measurement object S in order to perform measurement with high accuracy. In such a case, the above method may be used to adjust the posture of one of the measurement heads 200A and 200B.

That is, the reference member is disposed at a position where the surface of the measurement object S is to be disposed. Thereafter, the posture adjustment of one of the measurement heads 200A and 200B may be performed in the same manner as in the example of the above embodiment so that the optical axis is orthogonal to either the first surface or the second surface of the reference member.

The postures of the measurement heads 200A and 200B may be adjusted so that optical axes thereof are parallel to each other. For example, the posture adjustment of both the measurement heads 200A and 200B may be performed in the same manner as in the example of the above embodiment so that the optical axis is orthogonal to either the first surface or the second surface of the single reference member. In this case, it is possible to measure a height or the like of a step formed on the surface of the measurement object S based on the two displacements acquired corresponding to the measurement heads 200A and 200B, respectively.

[4] Correspondence Between Elements of Claims and Units of Embodiments

Hereinafter, an example of correspondence between each component of the claims and each unit of the embodiment will be described, but the present invention is not limited to the following example.

In the above embodiment, the lens unit 220 of the measurement head 200A and the optical fiber 314 of the measurement head 200A are examples of the first confocal optical system, the lens unit 220 of the measurement head 200B and the optical fiber 314 of the measurement head 200B are examples of the second confocal optical system, the spectroscopic unit 130 of the measurement unit 100A is an example of the first spectroscopic unit, and the spectroscopic unit 130 of the measurement unit 100B is an example of the second spectroscopic unit.

The confocal displacement sensor 500 is an example of a confocal displacement sensor, the light projecting unit 120 of the measurement units 100A and 100B is an example of a light projecting unit, the measurement head 200A is an example of a first head unit, the measurement head 200B is an example of a second head unit, the lens unit 220 of the measurement head 200A is an example of a first optical member, the optical fiber 314 of the measurement head 200A is an example of a first pinhole member, the lens unit 220 of the measurement head 200B is an example of a second optical member, and the optical fiber 314 of the measurement head 200B is an example of a second pinhole member.

The spectroscopic unit 130, the light receiving unit 140, and the measurement control unit 150 of the measurement units 100A and 100B are examples of the acquisition unit, the CPU 601 of the PC 600 is an example of the thickness calculation unit, the PC 600 is an example of the control device, the temporal change display control unit 659 is an example of the intensity information display control unit, and the maximum intensity display control unit 660 is an example of the maximum intensity display control unit.

The first wavelength range wr1 is an example of the first wavelength range, the second wavelength range wr2 is an example of the second wavelength range, the range display control unit 658 is an example of the range display control unit, the aligning degree display control unit 657 is an example of the aligning degree display control unit, the distance adjustment image im2, the holding device image, im3, and the second message tx2 are examples of the first and second distance adjustment images, and the distance adjustment image display control unit 661 is an example of the distance adjustment image display control unit.

The posture adjustment image im4 and the fourth message tx4 are examples of the first and second posture adjustment images, the posture adjustment image display control unit 662 is an example of the posture adjustment image display control unit, the axis adjustment images im5, im6, and im7, the sixth message tx6, the seventh message tx7, and the ninth message tx9 are examples of the axis adjustment image, the axis adjustment image display control unit 663 is an example of the axis adjustment image display control unit, and the next button 611 and the operation unit 620 displayed on the main display unit 610 are examples of the first to third operation units.

The light projecting unit 120 of the measurement unit 100A is an example of the first light projecting unit, the light projecting unit 120 of the measurement unit 100B is an example of the second light projecting unit, the light receiving unit 140 of the measurement unit 100A is an example of the first light receiving unit, the light receiving unit 140 of the measurement unit 100B is an example of the second light receiving unit, the light control unit 651 is an example of the light control section, and the main display unit 610 is an example of the display unit.

Various other elements having the features or functions described in the claims may be used as the respective elements of the claims.

What is claimed is:

1. A confocal displacement sensor comprising:
   a light projecting unit which emits light having a plurality of wavelengths;
   a first head unit which includes a first confocal optical system having a first diffraction lens, generating chromatic aberration along an optical axis direction in the light emitted by the light projecting unit, and converging the light on a first surface of a measurement object;
   a first spectroscope which divides a first light by each wavelength, the first light having been reflected by the first surface and having passed through the first confocal optical system;
   a first light receiving unit which receives the divided first light for each wavelength and acquires an intensity of the light for each wavelength; and
   a control device which is configured to be able to adjust an optical axis of the first head unit using a reference member having the first surface,
   wherein the first head unit is configured such that a first primary light having one wavelength, which is emitted to the first surface through the first head unit, is reflected by the first surface and passes the first confocal optical system through a path of a first multi-order light having the one wavelength when the optical axis of the first head unit is orthogonal to the first surface, and
   wherein the control device includes an intensity information display control unit causing a display unit to display, when adjusting the optical axis, as first intensity information, information on an intensity of a first determination light acquired from the first primary light having been reflected by the first surface and having passed the first confocal optical system through the path of the first multi-order light from among the intensities of the lights that the first light receiving unit receives, in a state where the reference member is disposed on a light emitting side of the first head unit.

2. The confocal displacement sensor according to claim 1, wherein the control device includes a posture adjustment image display control unit which causes the display unit to display, when the intensity information display control unit displays the first intensity information during adjusting the optical axis, a first posture adjustment image prompting an operation for adjusting a posture of the first head unit with respect to the reference member.

3. The confocal displacement sensor according to claim 1, wherein the first intensity information indicates a temporal change in an intensity of the first determination light.

4. The confocal displacement sensor according to claim 1, wherein the control device includes a display control unit causing a display unit to display a guidance screen to prompt an operation for adjusting a distance between the first head unit and the reference member and a posture of the first head unit with respect to the reference member in this order.

5. A confocal displacement sensor capable of measuring a thickness of a measurement object having first and second surfaces on opposite sides, the confocal displacement sensor comprising:
   a light projecting unit which emits light having a plurality of wavelengths;
   a first head unit which includes a first confocal optical system having a first diffraction lens, generating chromatic aberration along an optical axis direction in the light emitted by the light projecting unit, and converging the light on the first surface of the measurement object;
   a second head unit which includes a second confocal optical system having a second diffraction lens, generating chromatic aberration along an optical axis direction in the light emitted by the light projecting unit, and converging the light on the second surface of the measurement object;
   a first spectroscope which divides a first light by each wavelength, the first light having been reflected by the first surface and having passed through the first confocal optical system;
   a first light receiving unit which receives the divided first light for each wavelength and acquires an intensity of the light for each wavelength; and
   a control device which is configured to be able to adjust an optical axis of the first head unit using a reference member having the first and second surfaces parallel to each other instead of the measurement object,
   wherein the first head unit is configured such that a first primary light having one wavelength, which is emitted to the first surface through the first head unit, is reflected by the first surface and passes the first confocal optical system through a path of a first multi-order light having the one wavelength when the optical axis of the first head unit is orthogonal to the first surface,
   wherein the second head unit is configured such that a second primary light having one wavelength, which is emitted to the second surface through the second head unit, is reflected by the second surface and passes the second confocal optical system through a path of a second multi-order light having the one wavelength when the optical axis of the second head unit is orthogonal to the second surface, and
   wherein the control device includes an intensity information display control unit causing a display unit to display, when adjusting the optical axis, as first intensity information, information on an intensity of a first determination light acquired from the first primary light having been reflected by the first surface and having passed the first confocal optical system through the path of the first multi-order light from among the intensities of the lights that the first light receiving unit receives, in a state where the reference member is disposed between the first head unit and the second head unit.

6. The confocal displacement sensor according to claim 5, further comprising:
   a second spectroscope which divides the second light by each wavelength, the second light having been reflected by the second surface and having passed through the second confocal optical system; and
   a second light receiving unit which receives the divided second lights for each wavelength and acquires an intensity of the light for each wavelength, wherein the control device is configured to be able to further adjust the optical axis of the second head unit using the reference member, and wherein the intensity information display control unit causes the display unit to further display, when adjusting the optical axis, as second intensity information, information on an intensity of a second determination light acquired from the second primary light having been reflected by the second surface and having passed the second confocal optical system through the path of the second multi-order light from among intensities of the lights that the second light receiving unit receives, in a state where the reference member is disposed between the first head unit and the second head unit.

7. The confocal displacement sensor according to claim 6, wherein the first intensity information indicates a temporal change in an intensity of the first determination light, and wherein the second intensity information indicates a temporal change in an intensity of the second determination light.

8. The confocal displacement sensor according to claim 7, wherein the control device further includes a maximum intensity display control unit that causes the display unit to display first maximum intensity information indicating a maximum intensity by a present point in time in the temporal change of the intensity of the first determination light, and causes the display unit to display second maximum intensity information indicating a maximum intensity by the present point in time in the temporal change of the intensity of the second determination light.

9. The confocal displacement sensor according to claim 7, wherein a peak wavelength of the first determination light changes according to a distance between the first surface and the first head unit, and a peak wavelength of the second determination light changes according to a distance between the second surface and the second head unit, and wherein the control device further includes a range display control unit which controls the display unit to display a waveform of the first determination light on a wavelength axis, to change a position of the waveform of the first determination light on the wavelength axis according to a change in the distance between the first surface and the first head unit, and to display a range of the wavelength of the first determination light on the wavelength axis as a first wavelength range when the distance between the first surface and the first head unit is within a predetermined first distance range, and controls the display unit to display a waveform of the second determination light on the wavelength axis, to change a position of the waveform of the second determination light on the wavelength axis according to a change in the distance between the second surface and the second head unit, and to display a range of the wavelength of the second determination light on the wavelength axis as a second wavelength range when the distance between the second surface and the second head unit is within a predetermined second distance range.

10. The confocal displacement sensor according to claim 7, wherein the first and second light receiving units acquire at least one of an intensity of the light emitted from the first confocal optical system of the first head unit and incident on the second confocal optical system of the second head unit and an intensity of the light emitted from the second confocal optical system of the second head unit and incident on the first confocal optical system of the first head unit in a state where the reference member does not exist between the first and second head units, and wherein the control device further includes a aligning degree display control unit that causes the display unit to display aligning degree information indicating a aligning degree of optical axes of the first and second head units based on the at least one of the intensities acquired by the first and second light receiving units.

11. The confocal displacement sensor according to claim 10, wherein the control device further includes a distance adjustment image display control unit which causes the display unit to display, when adjusting the optical axis, a first distance adjustment image prompting an operation for adjusting a distance between the first head unit and the reference member, and a second distance adjustment image prompting an operation for adjusting a distance between the second head unit and the reference member, a posture adjustment image display control unit which causes the display unit to display, when adjusting the optical axis, a first posture adjustment image prompting an operation for adjusting a posture of the first head unit with respect to the reference member, and a second posture adjustment image prompting an operation for adjusting a posture of the second head unit with respect to the reference member, after the display unit displays the first and second distance adjustment images, and an axis adjustment image display control unit which causes the display unit to display, when adjusting the optical axis, an axis adjustment image prompting an operation for aligning the optical axes of the first and second head units by moving at least one of the first and second head units, after the display unit displays the first and second posture adjustment images.

12. The confocal displacement sensor according to claim 11, further comprising:

a first operation unit operated by a user to instruct display of the first and second distance adjustment images;

a second operation unit operated by the user to instruct display of the first and second posture adjustment images after displaying the first and second wavelength ranges by the range display control unit; and a third operation unit operated by the user to instruct display of the axis adjustment images after displaying the first and second intensity information by the intensity information display control unit.

13. The confocal displacement sensor according to claim 10, wherein the light projecting unit includes a first light projecting unit which emits a light to the first confocal optical system, and a second light projecting unit which emits a light to the second confocal optical system, and wherein the control device further includes a light control unit which performs at least one of a first control for controlling emission of the light in the first light projecting unit based on a light receiving signal output from the second light receiving unit and a second control for controlling emission of the light in the second light projecting unit based on a light receiving signal output from the first light receiving unit when the aligning degree display control unit displays the aligning degree information.

14. The confocal displacement sensor according to claim 5,
wherein the intensity information display control unit displays the first and second intensity information simultaneously on a single screen of the display unit.

15. The confocal displacement sensor according to claim 5,
wherein the confocal displacement sensor uses the light incident from one head unit of the first head unit and the second head unit to the other head unit to adjust the optical axis of the other head unit in a state where the first head unit and the second head unit are disposed to face each other.

16. The confocal displacement sensor according to claim 5, wherein the control device includes a posture adjustment image display control unit which causes the display unit to display, when the intensity information display control unit displays the first intensity information during adjusting the optical axis, a first posture adjustment image prompting an operation for adjusting a posture of the first head unit with respect to the reference member.

17. The confocal displacement sensor according to claim 5, wherein the control device includes a display control unit causing a display unit to display a guidance screen to prompt an operation for adjusting a distance between the first head unit and the reference member and a posture of the first head unit with respect to the reference member in this order.

18. A confocal displacement sensor capable of measuring a thickness of a measurement object having first and second surfaces on opposite sides, the confocal displacement sensor comprising:
a light projecting unit which emits a plurality of light having a plurality of wavelengths;
first and second head units;
a first optical member provided in the first head unit, having a diffraction lens for generating chromatic aberration along an optical axis direction in the plurality of light emitted by the light projecting unit, and converging the plurality of light having chromatic aberration to emit each of the plurality of light to the first surface of the measurement object;
a first pinhole member provided in the first head unit and having a plurality of first pinholes through which a plurality of light, which have been focused and reflected by the first surface, passes as a plurality of first lights from among the plurality of light emitted to the first surface by the first optical member;
a second optical member provided in the second head unit, having a diffraction lens for generating chromatic aberration along the optical axis direction in the plurality of light emitted by the light projecting unit, and converging the plurality of light having chromatic aberration to emit each of the plurality of light to the second surface of the measurement object;
a second pinhole member provided in the second head unit and having a plurality of second pinholes through which a plurality of light, which have been focused and reflected by the second surface, passes as a plurality of second light from among the plurality of light emitted the second surface by the second optical member;
an acquisition unit which acquires intensities of the plurality of first light having passed through the plurality of first pinholes for each wavelength and acquires intensities of the plurality of second light having passed through the plurality of second pinholes for each wavelength;
a thickness calculation unit which calculates a thickness between the first surface and the second surface of the measurement object based on the intensities of the plurality of first and second light for each wavelength acquired by the acquisition unit; and
a control device which is configured to be able to adjust optical axes of the first and second optical members using a reference member having the first and second surfaces parallel to each other instead of the measurement object,
wherein the first head unit is configured such that a first primary light having one wavelength, which is emitted to the first surface through the first optical member, is reflected by the first surface and passes the first pinhole through a path of a first multi-order light having the one wavelength when an optical axis of the first optical member is orthogonal to the first surface,
wherein the second head unit is configured such that a second primary light having one wavelength, which is emitted to the second surface through the second optical member, is reflected by the second surface and passes the second pinhole through a path of a second multi-order light having the one wavelength when an optical axis of the second optical member is orthogonal to the second surface, and
wherein the control device includes an intensity information display control unit, when adjusting the optical axis, causing a display unit to display, as first intensity information, information on an intensity of a first determination light acquired from the first primary light having been reflected by the first surface and having passed the first pinhole through the path of the first multi-order light from among the intensities of the plurality of light that the acquisition unit acquires, and to display as second intensity information, information on an intensity of a second determination light acquired from the second primary light having been reflected by the second surface and having passed the second pinhole through the path of the second multi-order light from among the intensities of the plurality of light that the acquisition unit acquires, in a state where the reference member is disposed between the first head unit and the second head unit.

19. The confocal displacement sensor according to claim 18,
wherein the first intensity information is a value based on a difference between a maximum intensity value and a minimum intensity value among a plurality of intensities of a plurality of first determination light corresponding to the first head unit, and
wherein the second intensity information is a value based on a difference between a maximum intensity value and a minimum intensity value among a plurality of intensities of a plurality of second determination light corresponding to the second head unit.

20. The confocal displacement sensor according to claim 18,
wherein the confocal displacement sensor has a measurement mode for measuring the measurement object and an optical axis adjustment mode for adjusting the optical axis of the head unit.

* * * * *